(12) United States Patent
Imazeki et al.

(10) Patent No.: US 12,197,090 B2
(45) Date of Patent: Jan. 14, 2025

(54) LIGHT ADJUSTMENT DEVICE AND LIGHT ADJUSTMENT DEVICE MANUFACTURING METHOD

(71) Applicant: Japan Display Inc., Tokyo (JP)

(72) Inventors: Yoshikatsu Imazeki, Tokyo (JP); Yoshifumi Kamei, Tokyo (JP); Takeo Koito, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/375,062

(22) Filed: Sep. 29, 2023

(65) Prior Publication Data

US 2024/0118574 A1 Apr. 11, 2024

(30) Foreign Application Priority Data

Oct. 6, 2022 (JP) .................................. 2022-161789

(51) Int. Cl.
*G02F 1/1347* (2006.01)
*G02F 1/1333* (2006.01)

(52) U.S. Cl.
CPC ...... *G02F 1/1347* (2013.01); *G02F 1/133308* (2013.01)

(58) Field of Classification Search
CPC ............. G02F 1/1347; G02F 1/133308; G02F 1/13452; E06B 2009/2464
See application file for complete search history.

(56) References Cited

U.S. PATENT DOCUMENTS

| 5,416,622 A | * | 5/1995 | Engfer .............. B32B 17/10761 313/511 |
| 2021/0239996 A1 | * | 8/2021 | Harden, Jr. ............. G02F 1/137 |
| 2024/0168345 A1 | * | 5/2024 | Liu ........................ G02F 1/1347 |

FOREIGN PATENT DOCUMENTS

| JP | 2004-333567 A | 11/2004 | |
| WO | WO-2012086311 A1 | * 6/2012 | ............... G02B 3/14 |

* cited by examiner

*Primary Examiner* — Jessica M Merlin
(74) *Attorney, Agent, or Firm* — K&L Gates LLP

(57) ABSTRACT

A light adjustment device includes a panel unit including a plurality of light adjustment panels stacked in a first direction, each light adjustment panel including a first substrate and a second substrate, the first substrate including a first terminal, the second substrate overlapping the first substrate and including a second terminal, and a metal film provided at a side part of the panel unit and extending in the first direction.

6 Claims, 20 Drawing Sheets

FIG.14
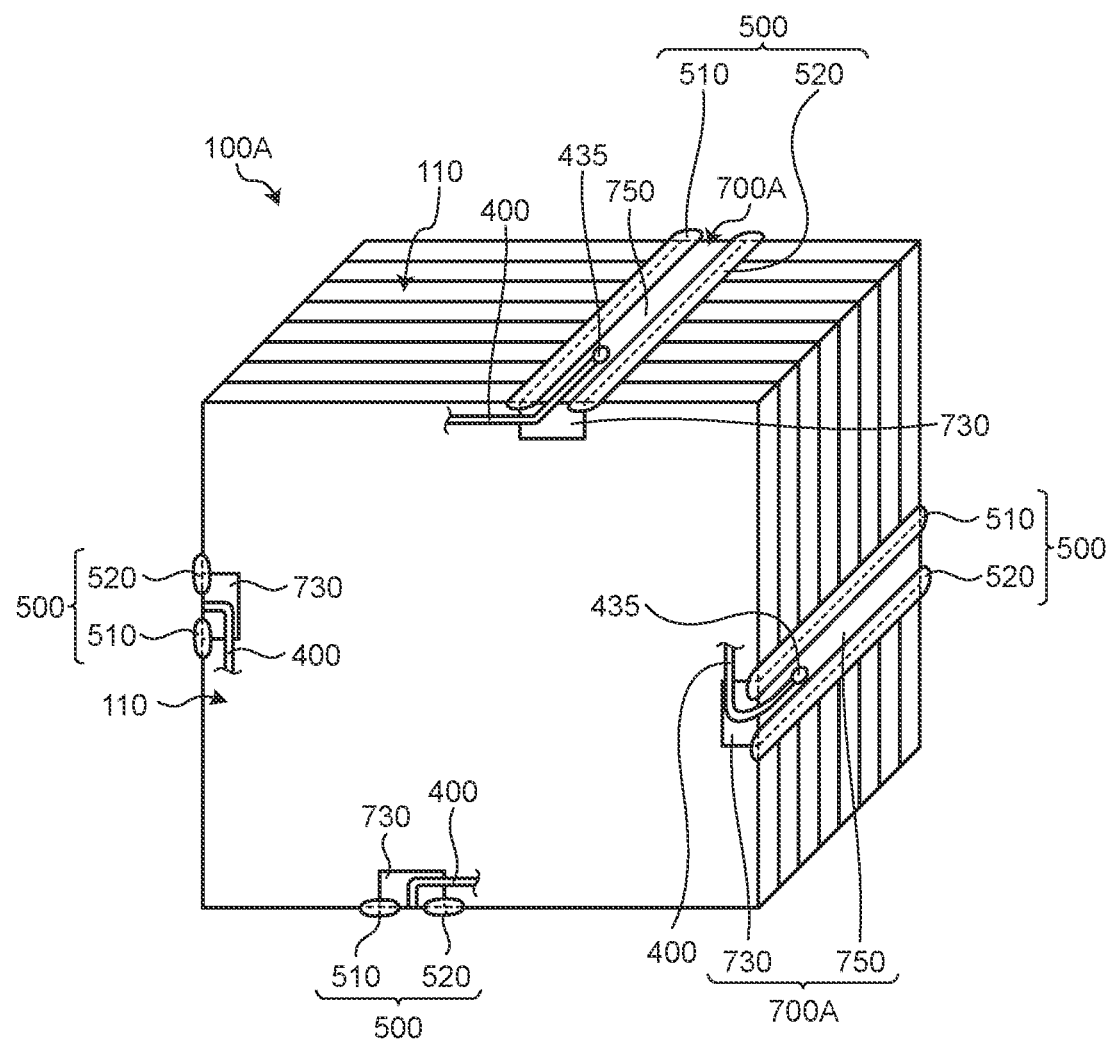
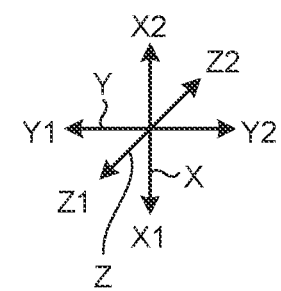

LIGHT ADJUSTMENT DEVICE AND LIGHT ADJUSTMENT DEVICE MANUFACTURING METHOD

CROSS-REFERENCE TO RELATED APPLICATION

This application claims the benefit of priority from Japanese Patent Application No. 2022-161789 filed on Oct. 6, 2022, the entire contents of which are incorporated herein by reference.

BACKGROUND

1. Technical Field

The present disclosure relates to a light adjustment device and a light adjustment device manufacturing method.

2. Description of the Related Art

A light adjustment device of Japanese Patent Application Laid-open Publication No. 2004-333567 (JP-A-2004-333567) includes a panel unit in which a plurality of light adjustment panels are stacked. Each light adjustment panel includes, for example, a first substrate, a second substrate, and a liquid crystal layer encapsulated between the substrates. When incident light enters from one side of the panel unit in the stacking direction, the light transmittance of the incident light is adjusted and the transmitted light thus adjusted exits from the other side of the panel unit in the stacking direction. In each light adjustment panel, the first substrate and the second substrate are stacked in the up-down direction. The first substrate and the second substrate are each provided with a terminal. Specifically, the size of the first substrate is set to be larger than the size of the second substrate such that part of the first substrate is exposed from the second substrate when viewed in the stacking direction of the light adjustment panels, and a terminal is provided at the exposed part. For example, a flexible printed circuit (FPC) is electrically coupled to the terminal.

Recently, downsizing of a light adjustment device has been requested.

The present disclosure is made in view of the request and intended to provide a light adjustment device having a reduced size when viewed in the stacking direction of light adjustment panels, and a method of manufacturing the light adjustment device.

SUMMARY

A light adjustment device according to an embodiment of the present disclosure includes a panel unit including a plurality of light adjustment panels stacked in a first direction, each light adjustment panel including a first substrate and a second substrate, the first substrate including a first terminal, the second substrate overlapping the first substrate and including a second terminal, and a metal film provided at a side part of the panel unit and extending in the first direction. The metal film includes a first site joined to a side surface of the first substrate of each of the plurality of light adjustment panels, a second site extending from the first site toward an inside of the panel unit and electrically coupled to the first terminal, a third site joined to a side surface of the second substrate of each of the plurality of light adjustment panels, and a fourth site extending from the third site toward the inside of the panel unit and electrically coupled to the second terminal.

A light adjustment device manufacturing method according to an embodiment of the present disclosure includes a panel unit production process of producing a panel unit stacking a plurality of light adjustment panels in a first direction, each light adjustment panel including first substrate and a second substrate, the first substrate including a first terminal, the second substrate overlapping the first substrate and including a second terminal, and a metal film formation process of forming a metal film by sputtering after the panel unit production process, the metal film being provided at a side part of the panel unit and extending in the first direction. The metal film includes a first site joined to a side surface of the first substrate of each of the plurality of light adjustment panels, a second site extending from the first site toward an inside of the panel unit and electrically coupled to the first terminal, a third site joined to a side surface of the second substrate of each of the plurality of light adjustment panels, and a fourth site extending from the third site toward the inside of the panel unit and electrically coupled to the second terminal.

BRIEF DESCRIPTION OF THE DRAWINGS

FIG. 14 is a perspective view schematically illustrating a light adjustment device according to a second embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
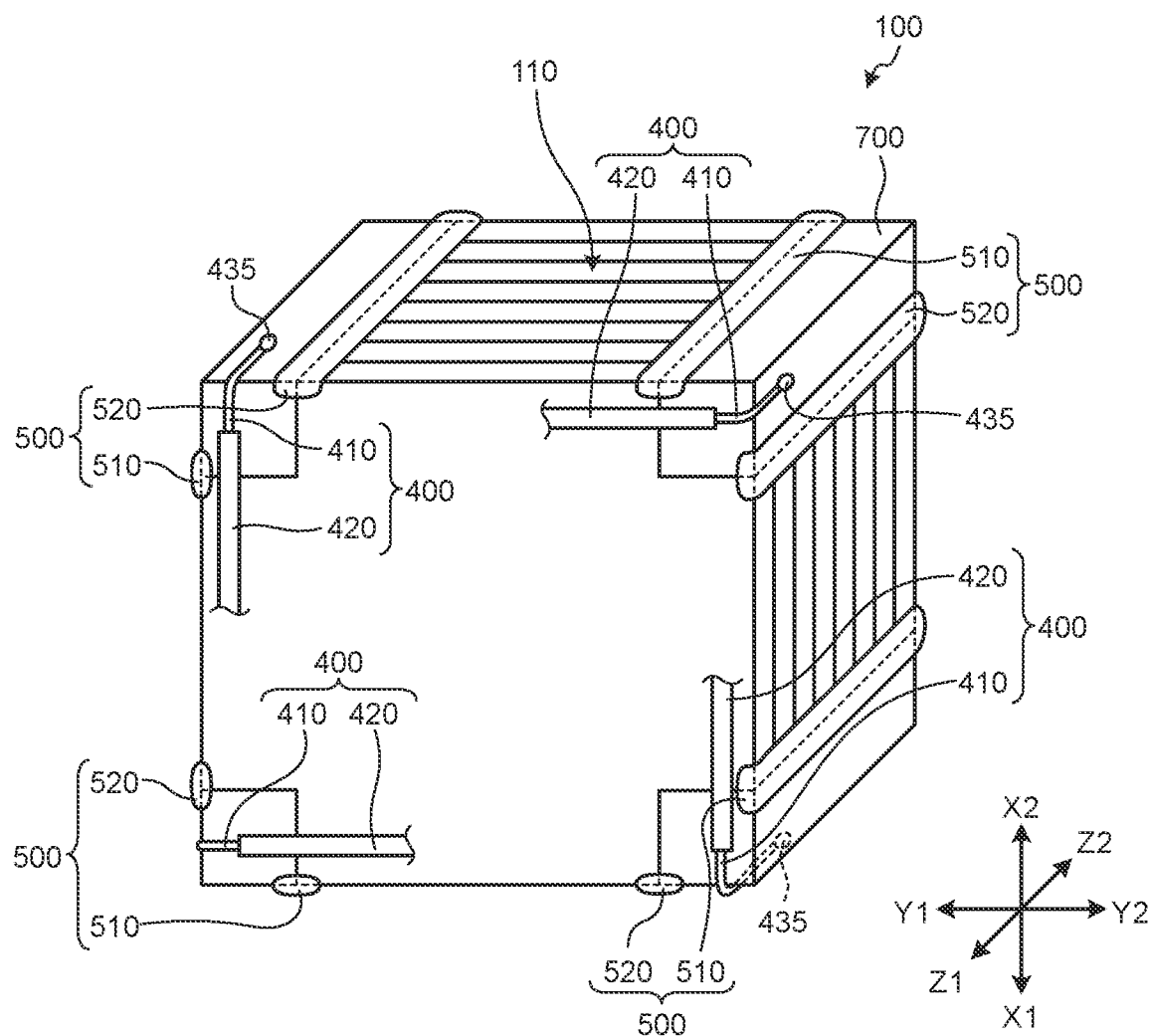
FIG. 1 is a perspective view schematically illustrating a light adjustment device according to a first embodiment.
Figure 2:
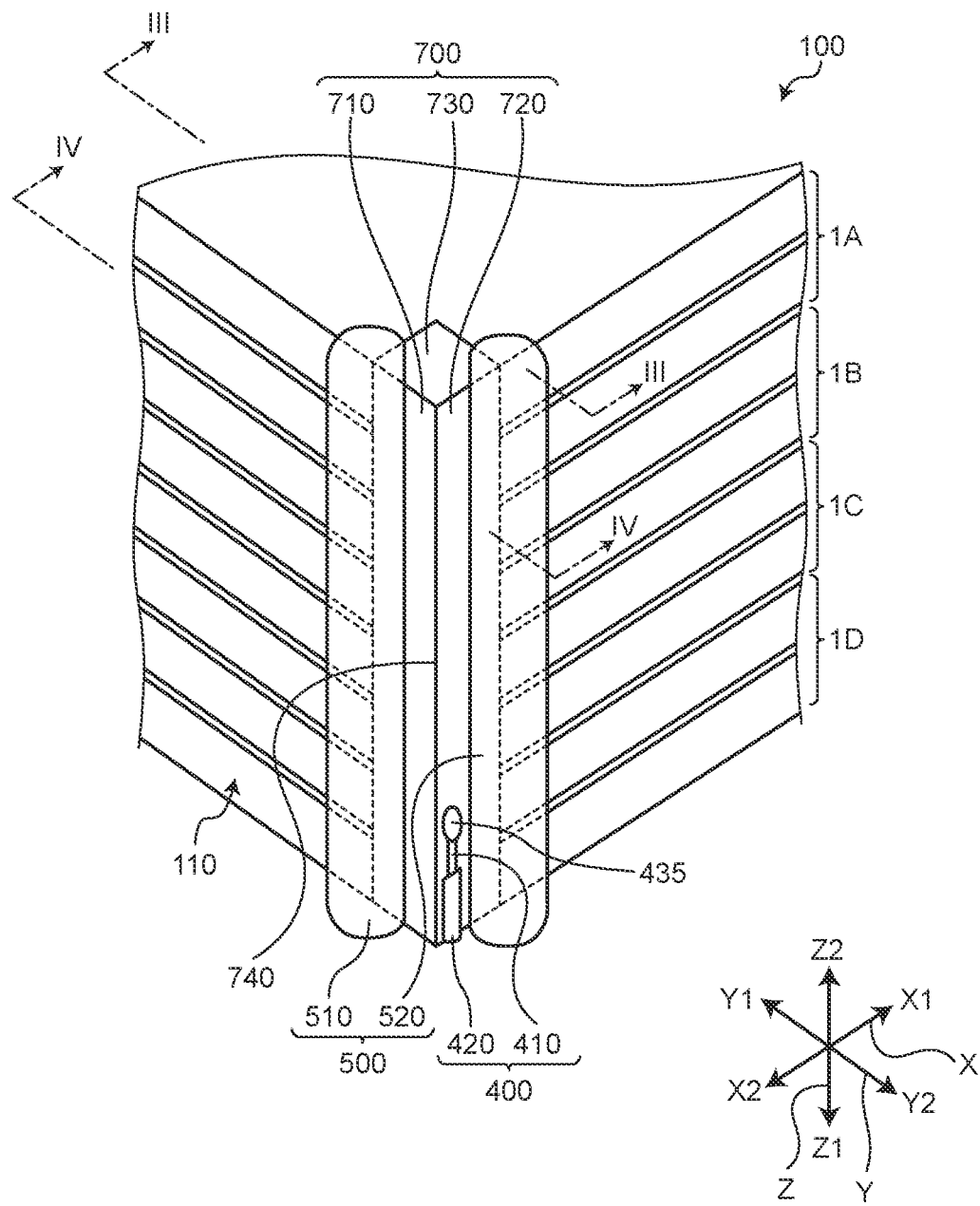
FIG. 2 is an enlarged perspective view of part of the light adjustment device in FIG. 1.
Figure 3:
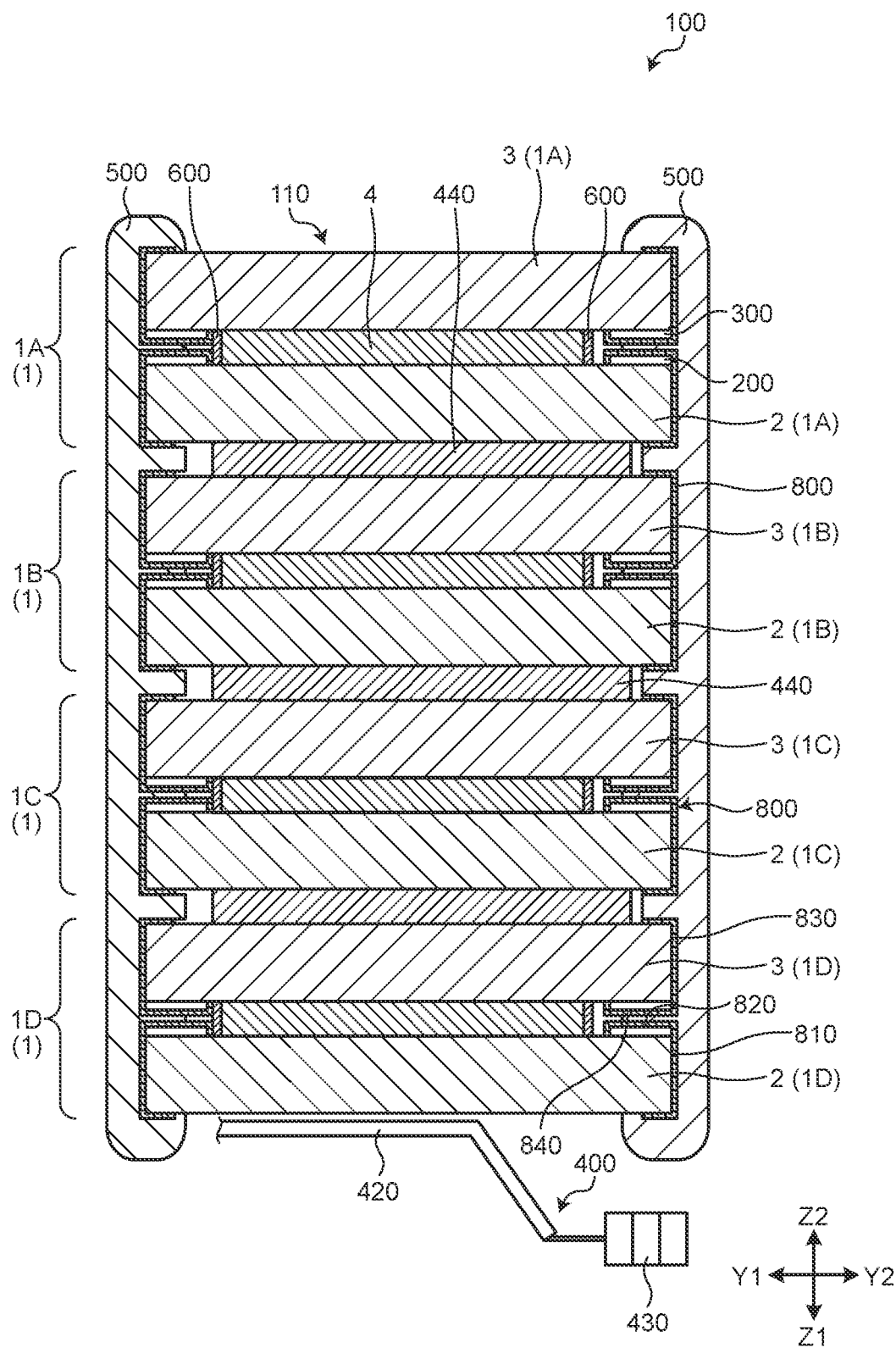
FIG. 3 is a sectional view taken along line III-III in FIG. 2.
Figure 4:
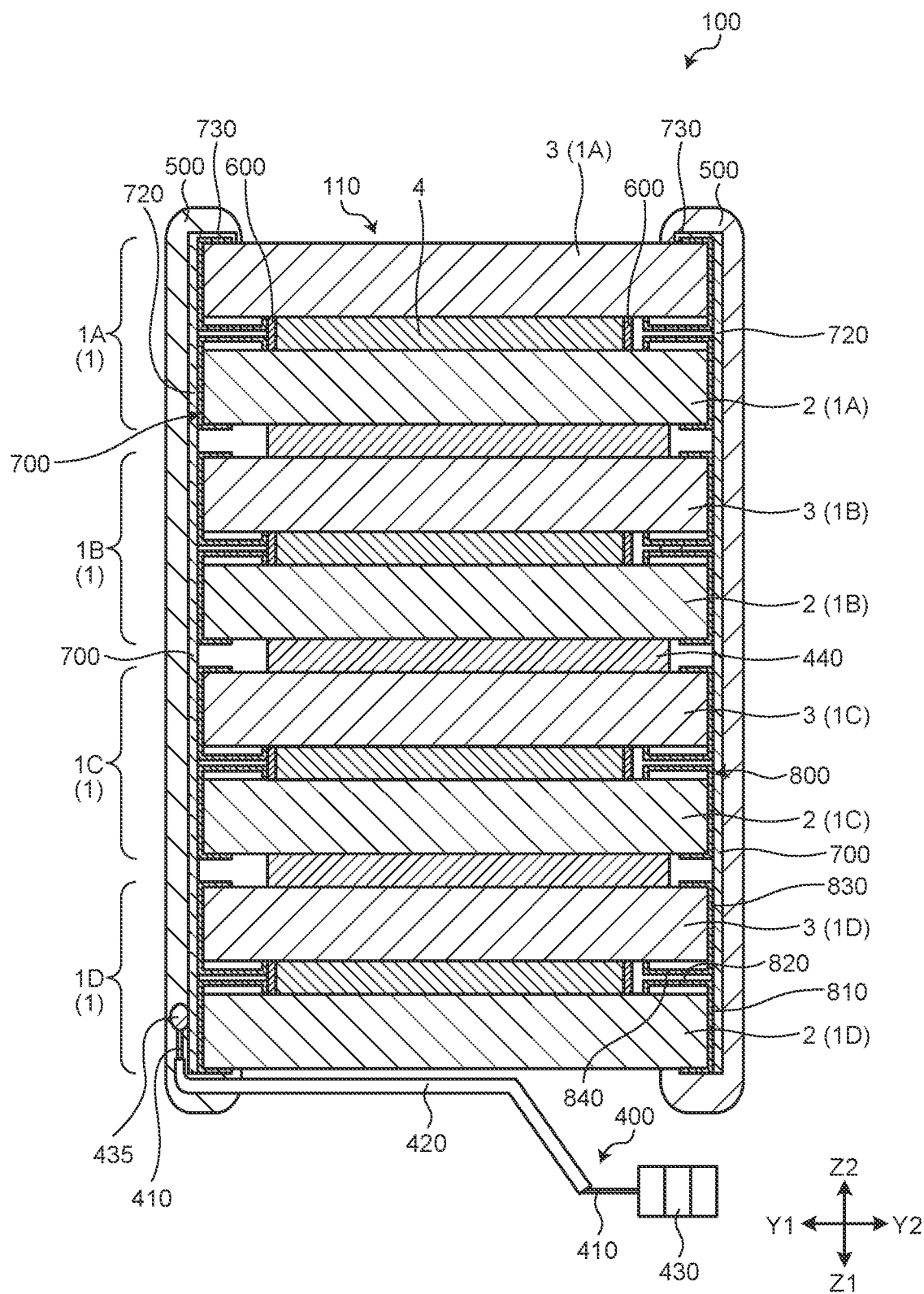
FIG. 4 is a sectional view taken along line IV-IV in FIG. 2.

The following first describes a light adjustment device according to a first embodiment. FIG. 1 is a perspective view schematically illustrating the light adjustment device according to the first embodiment. FIG. 2 is an enlarged perspective view of part of the light adjustment device in FIG. 1. FIG. 3 is a sectional view taken along line III-III in FIG. 2. FIG. 4 is a sectional view taken along line IV-IV in FIG. 2.

In an XYZ coordinate system illustrated in the drawings, an X direction is the front-back direction, and an X1 side is opposite an X2 side. The X1 side is also referred to as a front side, and the X2 side is also referred to as a back side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as a lower side, and the Z2 side is also referred to as an upper side. The Z direction is also referred to as a first direction, and for example, one side in the first direction is the Z1 side in the Z direction and the other side in the first direction is the Z2 side in the Z direction.

Configuration of Light Adjustment Device

As illustrated in FIGS. 1 to 4, a light adjustment device 100 according to the first embodiment includes a panel unit 110, a metal film 800, a metal plate 700, a conductive member 500, and an external coupling wire 400.

In the present embodiment, the panel unit 110 has a rectangular column shape formed of a plurality (in the embodiment, four) of light adjustment panels 1 stacked in the Z direction (first direction). The panel unit 110 is a rectangular column in the present embodiment but may be a polygonal column such as an octagonal column. Each light adjustment panel 1 is a square in the present embodiment, but the present invention is not limited thereto and each light adjustment panel 1 may be a polygon such as an octagon.

Specifically, as illustrated in FIGS. 3 and 4, the four light adjustment panels 1 are light adjustment panels 1A, 1B, 1C, and 1D that are stacked in order from the Z2 side. Each light adjustment panel 1 includes a first substrate (lower substrate) 2 disposed on the Z1 side, a second substrate (upper substrate) 3 disposed on the Z2 side of the first substrate 2, a sealing material 600 provided between the first substrate 2 and the second substrate 3, and a liquid crystal layer 4 filling inside the sealing material 600. The inside of the sealing material 600 is an effective region. The first substrate 2 and the second substrate 3 have substantially equal sizes when viewed from the Z direction. Each two adjacent light adjustment panels 1 in the Z direction are joined to each other through a translucent bonding agent 440 (for example, optical clear adhesive (OCA) or optical clear resin (OCR)).

The metal film 800 is provided at each of the four corners of the panel unit 110 and extends in the Z direction. Specifically, as illustrated in FIGS. 3 and 4, the metal films 800 are formed on the first substrate 2 and the second substrate 3. The metal films 800 are deposited, for example, by sputtering as described later in detail. The material of the metal films 800 is, for example, platinum (Pt). Each metal film 800 includes a first site 810, a second site 820, a third site 830, and a fourth site 840. The first site 810 is provided on a side surface (surface on a side in the Y direction) of the first substrate 2. The second site 820 extends from the first site 810 toward the inside of the panel unit 110. A first terminal 200 is provided on the first substrate 2. The second site 820 is electrically coupled to the first terminal 200. Specifically, the second site 820 covers the first terminal 200 to electrically couple the first site 810 and the first terminal 200. The third site 830 is joined to a side surface of the second substrate 3. The fourth site 840 extends from the third site 830 toward the inside of the panel unit 110. A second terminal 300 is provided on the second substrate 3. The fourth site 840 is electrically coupled to the second terminal 300. Specifically, the fourth site 840 covers the second terminal 300 to electrically couple the third site 830 and the second terminal 300.

As illustrated in FIGS. 1 and 2, the metal plate 700 and the conductive member 500 extend in the Z direction at each of the four corners of the panel unit 110.

The metal plate 700 is, for example, a conductive tape made of copper and has an adhesive back surface. As illustrated in FIG. 4, the adhesive surface of the tape is bonded on the first site 810 and the third site 830 of the corresponding metal film 800. Thus, the metal plate 700 contacts the first site 810 and the third site 830. The metal plate 700 is not limited to a copper tape but may be any conductive plate member. As illustrated in FIG. 2, the metal plate 700 extends from an end part of the panel unit 110 on the Z1 side to an end part thereof on the Z2 side. Specifically, the metal plate 700 extends from the light adjustment panel 1D to the light adjustment panel 1A. The metal plate 700 includes a first side surface part 710, a second side surface part 720, and a top surface part 730. The first side surface part 710 and the second side surface part 720 each have a rectangular shape extending long in the Z direction. The first side surface part 710 and the second side surface part 720 are coupled to each other through a bending part 740. The first side surface part 710 and the second side surface part 720 are substantially orthogonal to each other. In other words, the first side surface part 710 and the second side surface part 720 are in a substantially L shape when viewed in the Z direction. The top surface part 730 has a substantially rectangular shape when viewed in the Z direction. The top surface part 730 is provided at end parts of the first side surface part 710 and the second side surface part 720 on each of the Z1 side and the Z2 side. The top surface part 730 is connected to the first side surface part 710 and the second side surface part 720. The first side surface part 710, the second side surface part 720, and the top surface part 730 may be divided from one another and may be each bonded to the panel unit 110. Alternatively, the first side surface part 710, the second side surface part 720, and the top surface part 730 may be connected into one sheet and bonded to the panel unit 110.

The conductive member 500 contains a conductive material such as silver (Ag) or carbon (C). The conductive member 500 is, for example, paste and cured by drying after application. The conductive member 500 is continuously provided from an end part of the panel unit 110 on the Z2 side to an end part thereof on the Z1 side. As illustrated in FIG. 2, the conductive member 500 includes a first conductive member 510 and a second conductive member 520. The first site 810 and the third site 830 of the metal film 800 are formed on a side surface of the panel unit 110. The first conductive member 510 is provided so as to straddle the first side surface part 710 of the metal plate 700 and the first site 810 and the third site 830 of the metal film 800 (refer to FIG. 3, for example). Similarly, the second conductive member 520 is provided so as to straddle the second side surface part 720 of the metal plate 700 and the first site 810 and the third site 830 of the metal film 800 (refer to FIG. 3, for example).

The external coupling wire 400 is a conductive wire in the present embodiment but may be a flexible printed circuit (FPC). As illustrated in FIGS. 2 and 4, the external coupling wire 400 includes an electrical line 410 and a cover material 420. The cover material 420 covers the electrical line 410. A coupling part 435 is joined to the corresponding metal plate 700. The coupling part 435 is, for example, solder. One end of the electrical line 410 is coupled to an end part of the corresponding conductive member 500, and the other end of the electrical line 410 is coupled to, for example, a light source 430. The light source 430 emits light in accordance with electric power supply. The light source 430 is, for example, a light emitting diode (LED) but may be, for example, a filament lamp.

Light Adjustment Device Manufacturing Method

Figure 5:
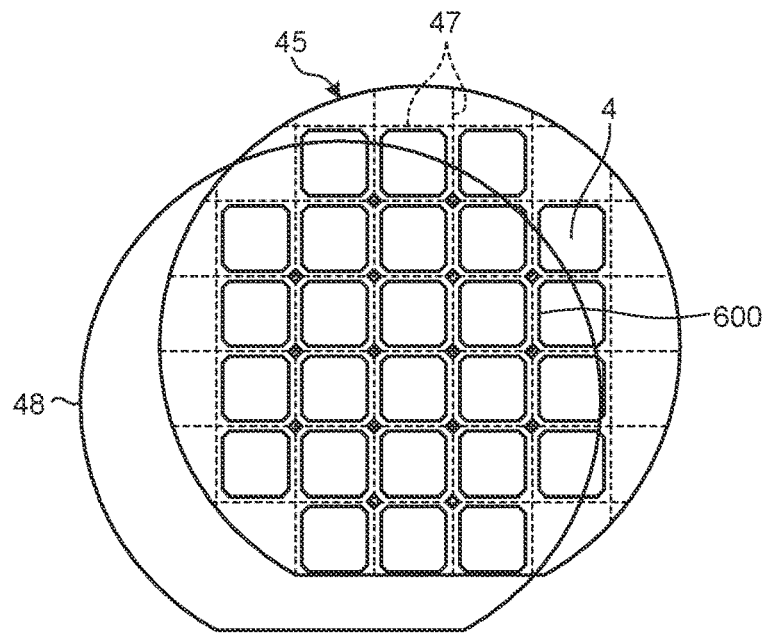
FIG. 5 is a schematic diagram illustrating a wafer provided with a plurality of cells.
Figure 6:
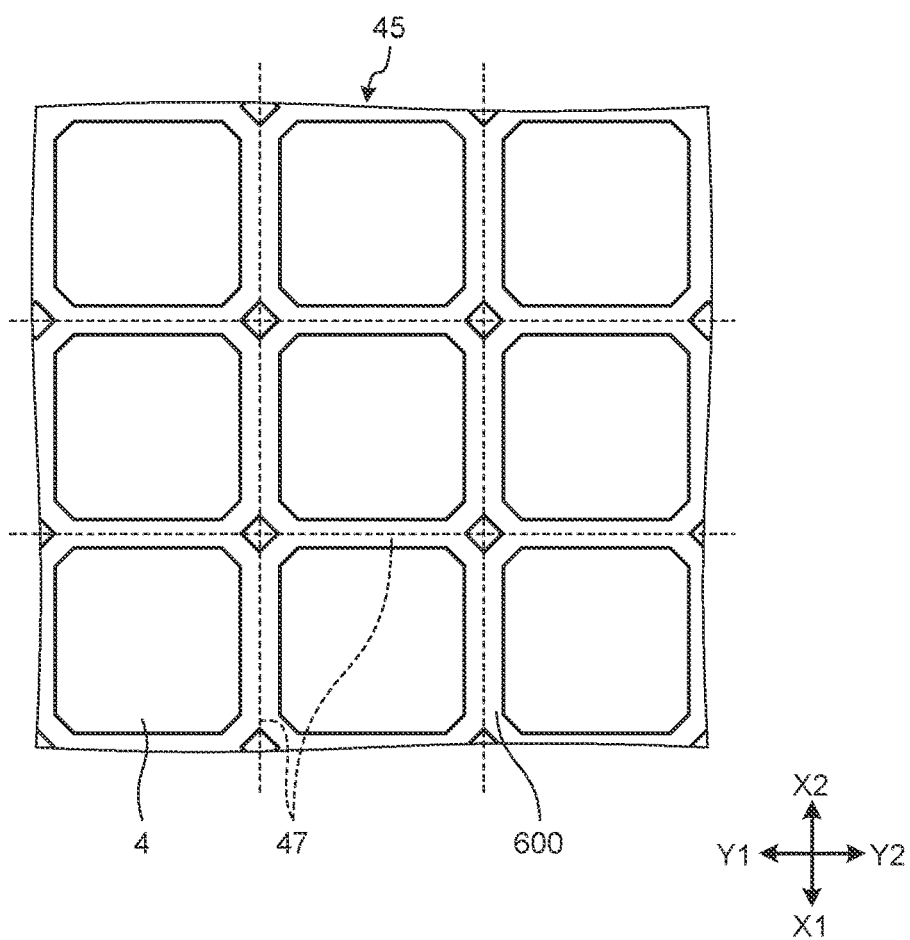
FIG. 6 is an enlarged plan view of part of FIG. 5.
Figure 7:
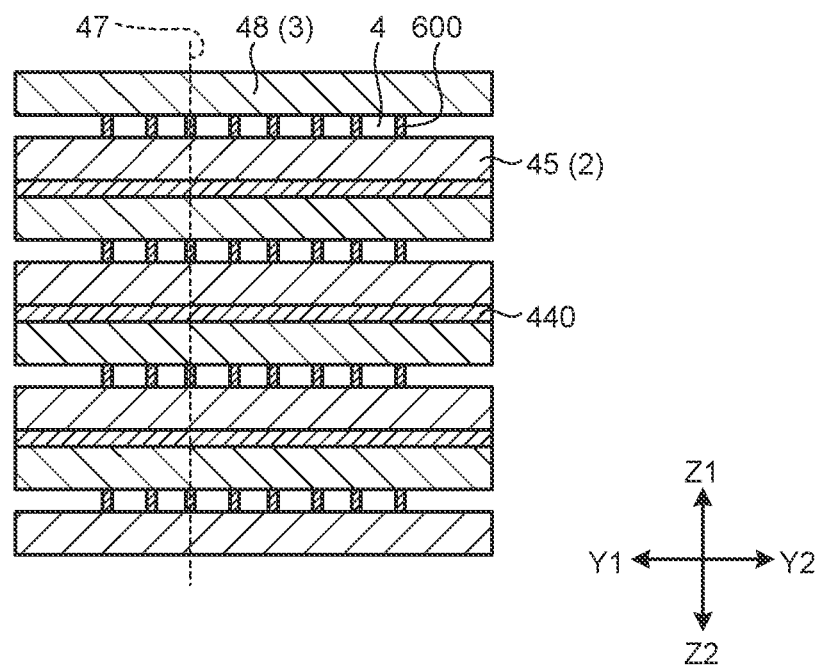
FIG. 7 is a sectional view of a stack of a plurality of layers of the cells in FIG. 5.
Figure 8:
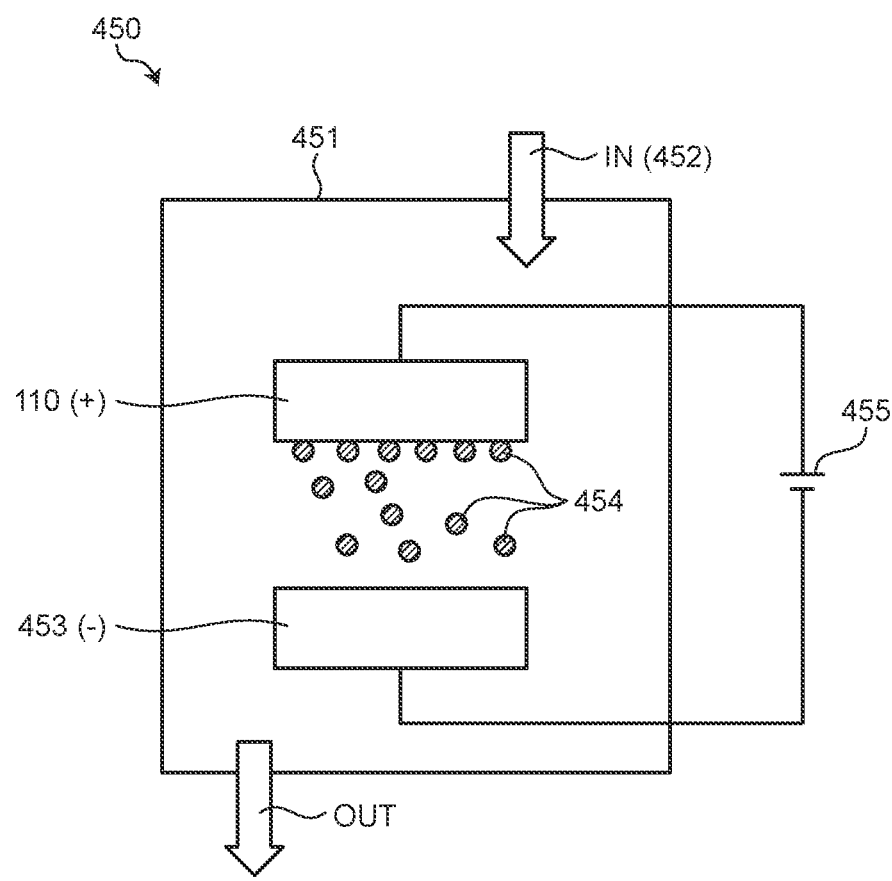
FIG. 8 is a schematic diagram illustrating a state in which a panel unit is provided with sputtering.

The following describes a method of manufacturing the light adjustment device 100. FIG. 5 is a schematic diagram illustrating a wafer provided with a plurality of cells. FIG. 6 is an enlarged plan view of part of FIG. 5. FIG. 7 is a sectional view of a stack of a plurality of layers of the cells in FIG. 5. FIG. 8 is a schematic diagram illustrating a state in which the panel unit is provided with sputtering. The method of manufacturing the light adjustment device 100 includes a panel unit production process, a metal film formation process, a metal plate attachment process, a conductive member formation process, and an external coupling wire attachment process.

Panel Unit Production Process

In the panel unit production process, the panel unit 110 is produced by stacking a plurality of light adjustment panels 1 in the Z direction, each light adjustment panel 1 including the first substrate 2 and the second substrate 3, the first substrate 2 including the first terminal 200, the second substrate 3 including the second terminal 300.

As illustrated in FIGS. 5 and 6, the sealing materials 600 and the liquid crystal layers 4 are disposed at constant intervals on a wafer 45 to be the first substrate 2. Each dashed line illustrates a division line 47. In other words, the sealing materials 600 are formed in a lattice shape in the X and Y directions, and then the liquid crystal layers 4 are formed by filling the inside of the sealing materials 600 with liquid crystal. Another wafer 48 to be the second substrate 3 is placed and attached thereon, and then such pairs of the wafers are vertically stacked and bonded by using the translucent bonding agent 440 (for example, OCR) as illustrated in FIG. 7. The division lines 47 are set along the width centers of the sealing materials 600 as illustrated in FIG. 6. No sealing material 600 is disposed but a rectangular gap is formed at each part where a longitudinal division line 47 intersects a transverse division line 47 as illustrated in FIG. 6. Then, separation is performed through disconnection along the division lines 47, for example, with a wire saw or by dicing, and accordingly, the panel unit 110 is completed.

Metal Film Formation Process

The metal film formation process is a process forming the metal films 800 by sputtering after the panel unit production process, the metal films 800 being provided at side parts of the panel unit 110 and extending in the Z direction.

The following first describes the configuration of a sputtering device 450 with reference to FIG. 8. As illustrated in FIG. 8, the sputtering device 450 includes a vacuum chamber 451, a target 453, and a power source 455. The target 453 and the panel unit 110 are housed inside the vacuum chamber 451. The panel unit 110 and the target 453 are coupled to the power source 455. The panel unit 110 is coupled to an anode, and the target 453 is coupled to a cathode. The material of the target 453 is, for example, platinum (Pt).

The following describes the contents of the metal film formation process. Sputtering is provided only at the corners of the panel unit 110, and thus the other sites of the panel unit 110 than the corners are masked in advance.

As illustrated in FIG. 8, first, the target 453 and the panel unit 110 are housed inside the vacuum chamber 451. Then, inert gas 452 is supplied into the vacuum chamber 451 and gas in the vacuum chamber 451 is discharged. In this state, when the power source 455 is turned on to apply voltage, gas ion atoms of the inert gas 452 collide with the surface of the target 453 and sputtered particles (Pt particles) 454 of the target material accumulate at the corners of the panel unit 110. Accordingly, the metal films 800 are deposited on the first sites 810, the second sites 820, the third sites 830, and the fourth sites 840 at the corners of the panel unit 110.

Metal Plate Attachment Process

The metal plate attachment process is a process attaching the metal plates 700 to the side parts of the panel unit 110 after the metal film formation process, the metal plates 700 contacting the metal films 800 at the first sites 810 and the third sites 830 and continuously extending in the Z direction as illustrated in FIG. 2.

As described above, each metal plate 700 is, for example, a conductive tape made of copper and has an adhesive back surface. Specifically, the copper tape is bonded on the metal film 800 at the first site 810 and the third site 830 at each side part of the panel unit 110.

Conductive Member Formation Process

The conductive member formation process is a process forming the conductive members 500 at the side parts of the panel unit 110 after the metal plate attachment process, the conductive members 500 straddling and joining side parts of the metal plates 700 and the metal films 800 and continuously extending in the Z direction as illustrated in FIG. 2.

As described above, each conductive member 500 contains a conductive material such as silver (Ag) or carbon (C). Specifically, the conductive member 500 is, for example, paste containing the conductive material. The conductive member 500 is applied and cured at each corner of the panel unit 110. The paste has viscosity, and thus enters between each first substrate 2 and the corresponding second substrate 3 and covers the first terminal 200 and the second terminal 300 thereof as illustrated in FIGS. 3 and 4. Accordingly, the conductive member 500 is electrically coupled to the first terminal 200 and the second terminal 300.

External Coupling Wire Attachment Process

The external coupling wire attachment process is a process attaching each external coupling wire 400 to the corresponding metal plate 700 after the metal plate attachment process as illustrated in FIG. 4.

Specifically, the coupling part 435 is joined on the metal plate 700. The coupling part 435 is, for example, solder. The electrical line 410 of the external coupling wire 400 is joined to the solder. Specifically, one end of the electrical line 410 of the external coupling wire 400 is coupled to the solder, and the other end is coupled to the light source 430. In this manner, solder (coupling part 435) is joined on the metal plate 700, and the external coupling wire 400 is coupled through the solder.

Wires and Terminals on First and Second Substrates

Figure 9:
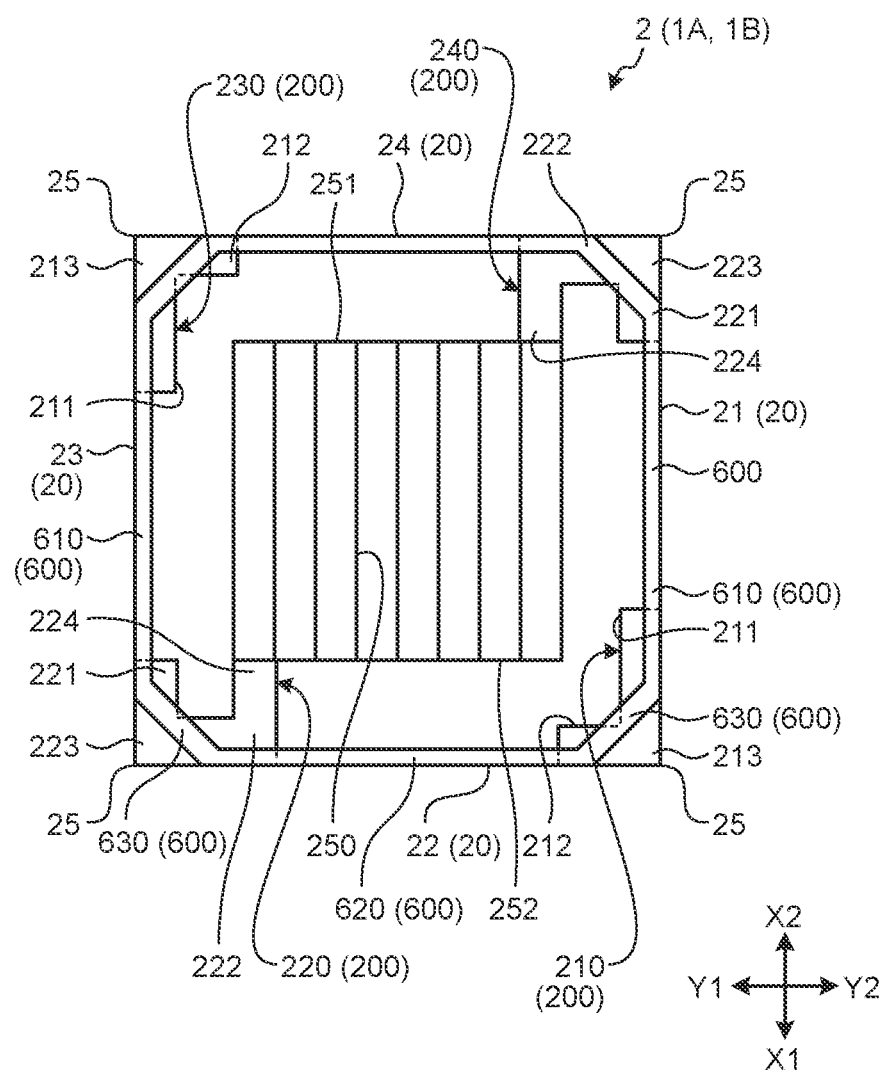
FIG. 9 is a plan view of a first substrate of each of light adjustment panels disposed first and second from a Z2 side in a panel unit illustrated in FIG. 2.
Figure 10:
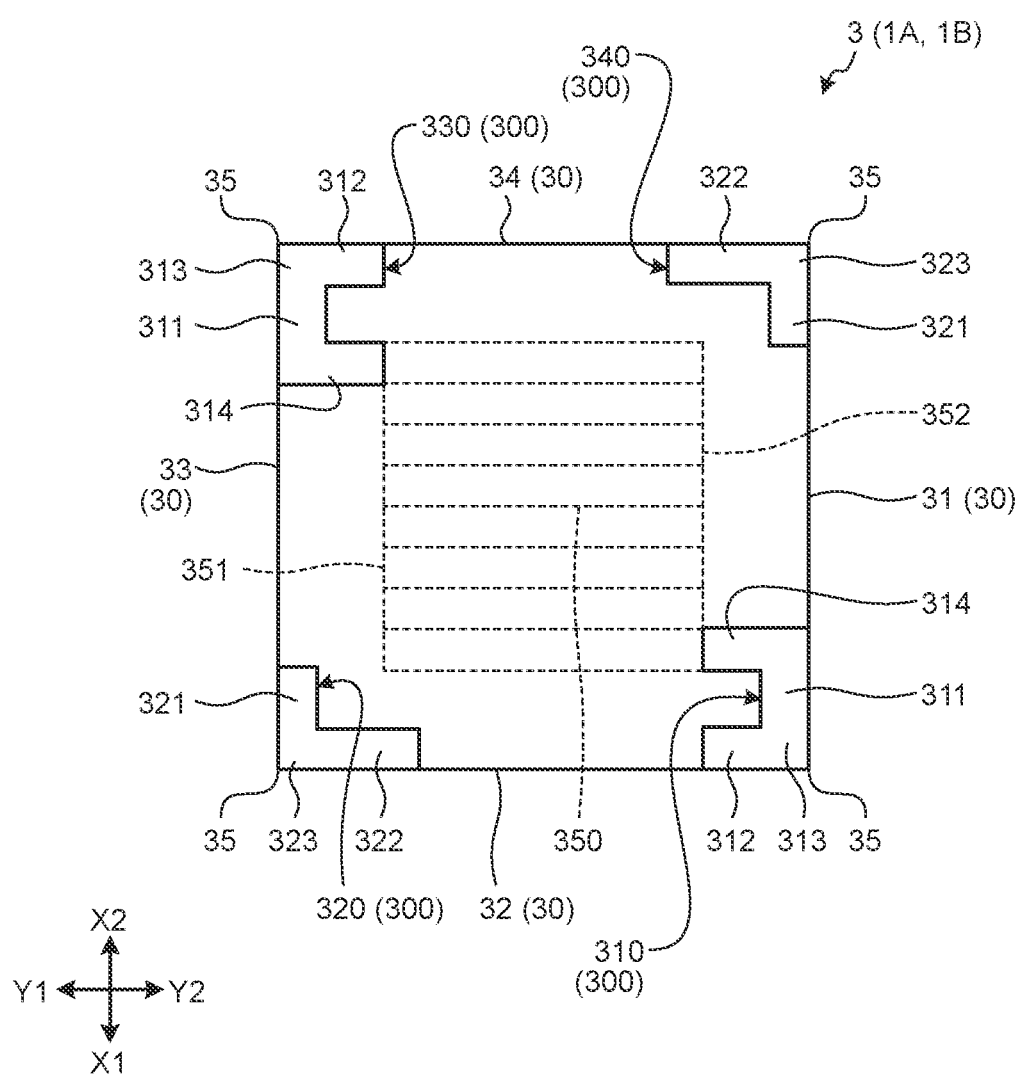
FIG. 10 is a plan view of a second substrate of each of the light adjustment panels disposed first and second from the Z2 side in the panel unit illustrated in FIG. 2.
Figure 11:
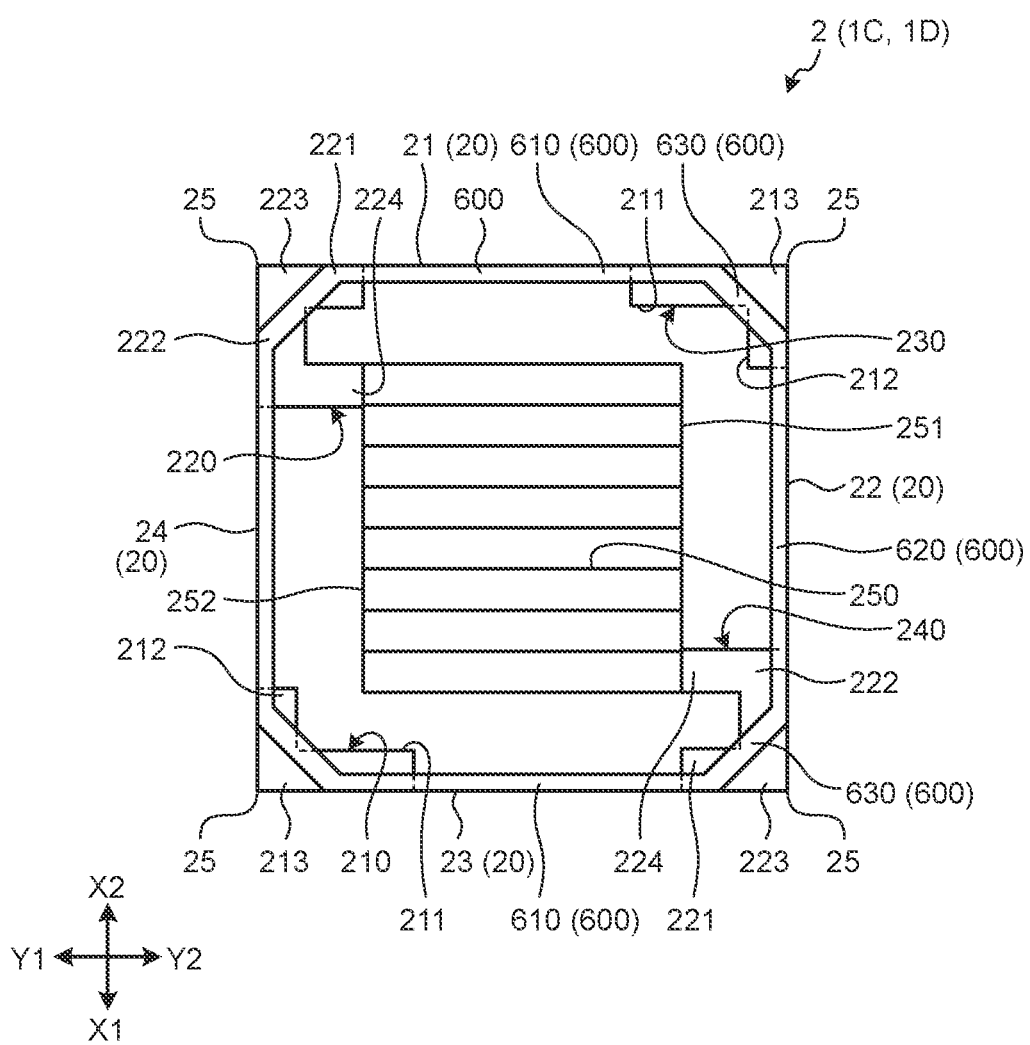
FIG. 11 is a plan view of a first substrate of each of light adjustment panels disposed third and fourth from the Z2 side in the panel unit illustrated in FIG. 2.
Figure 12:
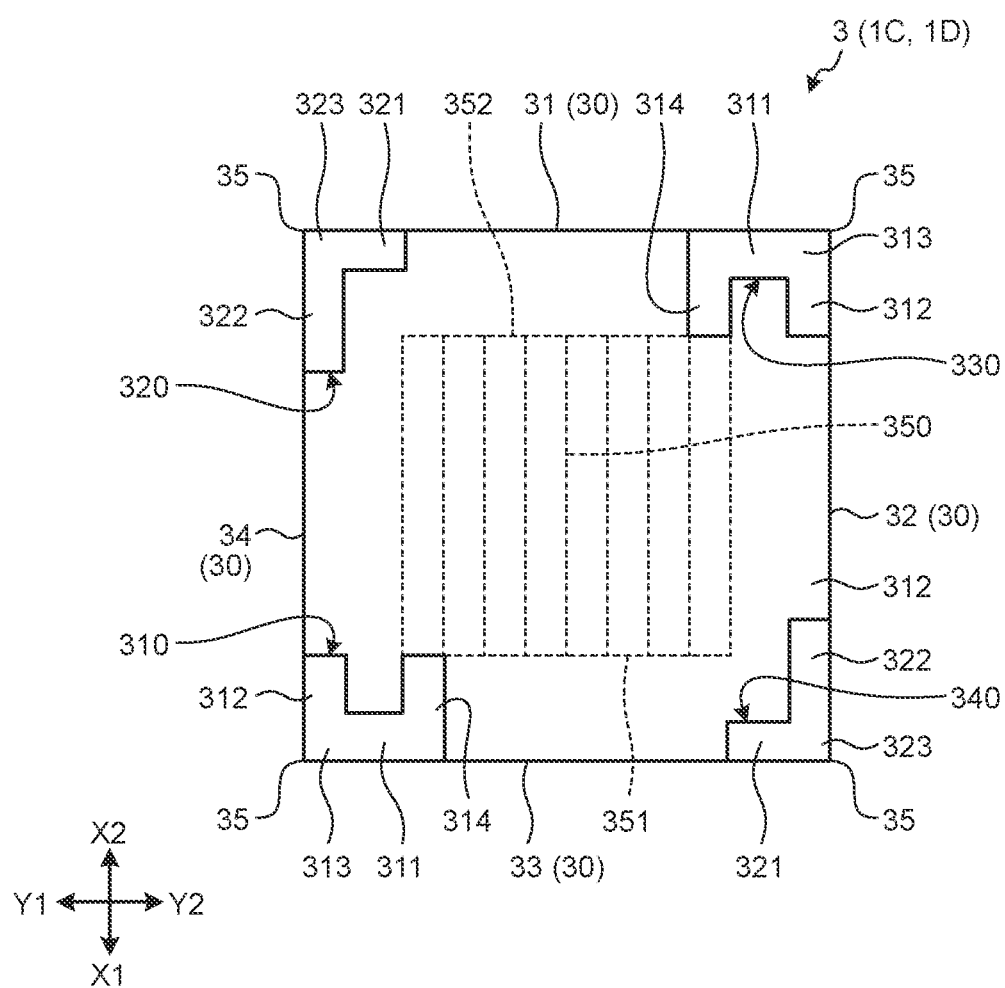
FIG. 12 is a plan view of a second substrate of each of the light adjustment panels disposed third and fourth from the Z2 side in the panel unit illustrated in FIG. 2.

The following describes wires and terminals of each first substrate 2 and each second substrate 3 included in the panel unit 110 in detail. FIG. 9 is a plan view of the first substrate of each of light adjustment panels disposed first and second from the Z2 side in the panel unit illustrated in FIG. 2. FIG. 10 is a plan view of the second substrate of each of the light adjustment panels disposed first and second from the Z2 side in the panel unit illustrated in FIG. 2. FIG. 11 is a plan view of the first substrate of each of light adjustment panels disposed third and fourth from the Z2 side in the panel unit illustrated in FIG. 2. FIG. 12 is a plan view of the second substrate of each of the light adjustment panels disposed third and fourth from the Z2 side in the panel unit illustrated in FIG. 2.

As described above with reference to FIGS. 2 to 4, the four light adjustment panels 1 are the light adjustment panel 1A, the light adjustment panel 1B, the light adjustment panel 1C, and the light adjustment panel 1D stacked in order from the Z2 side.

As illustrated in FIG. 9, the first substrate 2 of each of the light adjustment panel 1A and the light adjustment panel 1B includes the first terminal 200 and a liquid crystal drive electrode 250. The first terminal 200 includes first terminals 210, 220, 230, and 240. The first substrate 2 is a square in plan view from the Z direction and has four sides 20. Specifically, the sides 20 are sides 21, 22, 23, and 24. The side 21 is positioned on the Y2 side. The side 22 is positioned on the X1 side. The side 23 is positioned on the Y1 side. The side 24 is positioned on the X2 side.

The first terminal 210 includes a first site 211, a second site 212, and a first corner 213. The first terminal 210 has an L shape in plan view in the present embodiment. The first site 211 and the second site 212 are wide strip bodies. The first site 211 extends along the side 21. The second site 212 extends along the side 22. The sides 21 and 22 are adjacent to each other. The first site 211 and the second site 212 are connected to each other at the first corner 213.

The first terminal 220 includes a first site 221, a second site 222, a first corner 223, and a protrusion part 224. The first terminal 220 has a U shape in plan view in the present embodiment. The first site 221 and the second site 222 are wide strip bodies. The first site 221 extends along the side 23. The second site 222 extends along the side 22. The sides 23 and 22 are adjacent to each other. The first site 221 and the second site 222 are connected to each other at the first corner 223. The first terminal 230 has the same shape as the first terminal 210, and the first terminal 240 has the same shape as the first terminal 220.

Each sealing material 600 includes a first peripheral part 610, a second peripheral part 620, and a coupling part 630. The first peripheral part 610 extends along, for example, the side 21. The second peripheral part 620 extends along, for example, the side 22. An end of the first peripheral part 610 and an end of the second peripheral part 620 are separated from an intersection part 25. Thus, the coupling part 630 connecting the end of the first peripheral part 610 and the end of the second peripheral part 620 obliquely intersects the first peripheral part 610 and the second peripheral part 620. The angle of the intersection is, for example, 45°. In this manner, the coupling part 630 is disposed on the inner side of the intersection part 25 (the central side of the first substrate 2). Accordingly, part of the first corner 213 is exposed from the coupling part 630 of the sealing material 600. The exposed part has a substantially triangular shape in plan view. Similarly at each of the other three corners of the first substrate 2, part of the first corner 213 or 223 is exposed from the coupling part 630 of the corresponding sealing material 600 and has a substantially triangular shape in plan view.

As illustrated in FIG. 9, the liquid crystal drive electrode 250 is provided at the center of the first substrate 2. A plurality of the liquid crystal drive electrodes 250 are provided and extend in the X direction. An end of each liquid crystal drive electrode 250 on the X2 side is coupled to a wire 251. The wire 251 extends in the Y direction. An end of each liquid crystal drive electrode 250 on the X1 side is coupled to a wire 252. The wire 252 extends in the Y direction. The first terminal 240 is coupled to the wire 251. The first terminal 220 is coupled to the wire 252.

As illustrated in FIG. 10, the second substrate 3 of each of the light adjustment panel 1A and the light adjustment panel 1B includes the second terminal 300 and a liquid crystal drive electrode 350. The second terminal 300 includes second terminals 310, 320, 330, and 340. The second substrate 3 is a square in plan view from the Z direction and has four sides 30. Specifically, the sides 30 are sides 31, 32, 33, and 34. The side 31 is positioned on the Y2 side. The side 32 is positioned on the X1 side. The side 33 is positioned on the Y1 side. The side 34 is positioned on the X2 side.

The second terminal 310 includes a third site 311, a fourth site 312, a second corner 313, and a protrusion part 314. The second terminal 310 has a U shape in plan view in the present embodiment. The third site 311, the fourth site 312, and the protrusion part 314 are wide strip bodies. The third site 311 extends along the side 31. The fourth site 312 extends along the side 32. The sides 31 and 32 are adjacent to each other. The third site 311 and the fourth site 312 are connected to each other at the second corner 313. The protrusion part 314 extends from the third site 311 to the Y1 side.

The second terminal 320 includes a third site 321, a fourth site 322, and a second corner 323. The second terminal 320 has an L shape in plan view in the present embodiment. The third site 321 and the fourth site 322 are wide strip bodies. The third site 321 extends along the side 33. The fourth site 322 extends along the side 32. The sides 33 and 32 are adjacent to each other. The third site 321 and the fourth site 322 are connected to each other at the second corner 323. The second terminal 330 has the same shape as the second terminal 310, and the second terminal 340 has the same shape as the second terminal 320.

As illustrated in FIG. 10, the liquid crystal drive electrode 350 is provided at the center of the second substrate 3. A plurality of the liquid crystal drive electrodes 350 are provided and extend in the Y direction. An end of each liquid crystal drive electrode 350 on the Y1 side is coupled to a wire 351. The wire 351 extends in the X direction. An end of each liquid crystal drive electrode 350 on the Y2 side is coupled to a wire 352. The wire 352 extends in the X direction. The second terminal 330 is coupled to the wire 351. The second terminal 320 is coupled to the wire 352.

As illustrated in FIG. 11, the first substrate 2 of each of the light adjustment panel 1C and the light adjustment panel 1D is obtained by rotating the first substrate 2 of each of the light adjustment panel 1A and the light adjustment panel 1B illustrated in FIG. 9 by 90° in the clockwise direction (rightward direction). Thus, the substrates are the same but are different in disposition by 90° of rotation about the substrate center. Accordingly, for example, the side 21 is positioned on the Y2 side in the first substrate 2 of each of the light adjustment panel 1A and the light adjustment panel 1B, but the side 21 is positioned on the X1 side in the first substrate 2 of each of the light adjustment panel 1C and the light adjustment panel 1D.

As illustrated in FIG. 12, the second substrate 3 of each of the light adjustment panel 1C and the light adjustment panel 1D is obtained by rotating the second substrate 3 of each of the light adjustment panel 1A and the light adjustment panel 1B illustrated in FIG. 10 by 90° in the clockwise direction (rightward direction). Thus, the substrates are the same but are different in disposition by 90° of rotation about the substrate center. Accordingly, for example, the side 31 is positioned on the Y2 side in the second substrate 3 of each of the light adjustment panel 1A and the light adjustment panel 1B, but the side 31 is positioned on the X1 side in the second substrate 3 of each of the light adjustment panel 1C and the light adjustment panel 1D.

Figure 13:
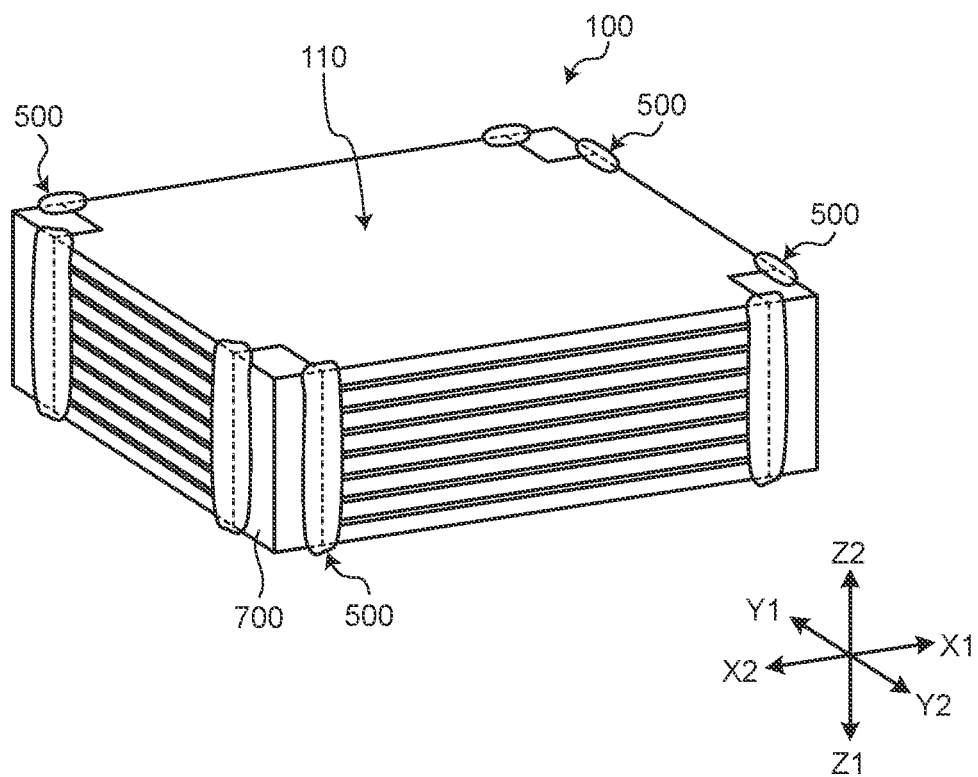
FIG. 13 is a schematic diagram of the light adjustment device according to the first embodiment.

FIG. 13 is a schematic diagram of the light adjustment device according to the first embodiment. The panel unit 110 illustrated in FIG. 13 is obtained by stacking the above-described light adjustment panels 1A, 1B, 1C, and 1D in order in the Z direction. In other words, the panel unit 110 is obtained when the light adjustment panel 1A for p-wave polarization, the light adjustment panel 1B for s-wave polarization, the light adjustment panel 1C for p-wave polarization, and the light adjustment panel 1D for s-wave polarization are stacked in an axial direction in the stated order. Thereafter, the metal films 800, the metal plates 700, the conductive members 500, and the external coupling wires 400 (refer to FIG. 4) are provided at the four corners of the panel unit 110 as described above, which completes the light adjustment device 100 according to the first embodiment.

As described above, the light adjustment device 100 includes the panel unit 110 including a plurality of light adjustment panels 1 stacked in the Z direction (first direction), and the metal film 800 provided at each side part of the panel unit 110 and extending in the Z direction. The metal film 800 includes the first site 810 joined to the side surface of the first substrate 2, the second site 820 extending from the first site 810 toward the inside of the panel unit 110 and electrically coupled to the first terminal 200, the third site 830 joined to the side surface of the second substrate 3, and the fourth site 840 extending from the third site 830 toward the inside of the panel unit 110 and electrically coupled to the second terminal 300. The light adjustment device manufacturing method includes the panel unit production process of producing the panel unit 110 by stacking a plurality of light adjustment panels 1 in the Z direction, and the metal film formation process of forming, by sputtering, the metal film 800 provided at each side part of the panel unit 110 and extending in the Z direction.

As described above, in JP-A-2004-333567, for example, the size of a first substrate is set to be larger than the size of a second substrate such that part of the first substrate is exposed from the second substrate when viewed in the stacking direction (first direction) of the light adjustment panels, and a terminal is provided at the exposed part. External coupling wires are electrically coupled to respective terminals of all light adjustment panels, and thus the size of a light adjustment device potentially increases.

However, in the present embodiment, the metal film 800 is provided at each side part of the panel unit 110 and electrically coupled to the first terminal 200 of the first substrate 2 and the second terminal 300 of the second substrate 3. Thus, when the metal plate 700 or the conductive member 500 is provided and electrically coupled to the metal film 800 of each light adjustment panel 1, the light adjustment device 100 can have a reduced size when viewed in the Z direction.

In the first embodiment, the metal film 800, the metal plate 700, and the conductive member 500 are provided at each of the four corners of the panel unit 110. The corners correspond to intersection parts 25 where, for example, the sides 21 and 22 intersect each other in the first substrate 2 as illustrated in FIGS. 9 and 11, and intersection parts 35 where, for example, the sides 31 and 32 intersect each other in the second substrate 3 as illustrated in FIGS. 10 and 12. In a case in which the metal film 800 are to be formed at each intersection part 25 or 35 by sputtering, particles (Pt particle) 454 of the target material enter between the first substrate 2 and the second substrate 3 in both the X and Y directions illustrated in, for example, FIG. 9, and the particles 454 from the X direction join the particles 454 from the Y direction. Thus, the metal film 800 can be more easily formed at a larger thickness than in a case in which, for example, the particles 454 enter between the first substrate 2 and the second substrate 3 from a middle part of the side 21 and a middle part of the side 31, and this is an advantage.

The light adjustment device 100 includes the metal plate 700 contacting the first site 810 and the second site 820 of the metal film 800 and continuously extending in the Z direction. The light adjustment device manufacturing method includes the metal plate attachment process of attaching the metal plate 700 to the side part of the panel unit 110.

In this manner, since the metal plate 700 is electrically coupled to the metal film 800, the metal plate 700 is electrically coupled to the first terminals 200 and the second terminals 300 of all light adjustment panels 1. Accordingly, when the external coupling wire 400 is coupled to the metal plate 700, the external coupling wire 400 is electrically coupled to the first terminals 200 and the second terminals 300 of all light adjustment panels 1. Thus, according to the present embodiment, the light adjustment device 100 can have a reduced size when viewed in the Z direction.

Moreover, since the external coupling wire 400 is coupled to the metal plate 700, attachment of the external coupling wire 400 can be more easily performed.

The light adjustment device 100 includes the conductive member 500 straddling and joining a side part of the metal plate 700 and the metal film 800 and continuously extending in the Z direction. The light adjustment device manufacturing method includes the conductive member formation process of forming the conductive member 500 at the side parts of the panel unit 110, the conductive member 500 straddling and joining the side part of the metal plate 700 and the metal film 800 and continuously extending in the Z direction.

In this manner, the conductive member 500 contacts both the metal film 800 and the metal plate 700. Thus, variation in electric coupling between the metal plate 700 and each of the first terminals 200 and the second terminals 300 can be further reduced.

Specifically, when the metal plate 700 is made contact with the metal film 800, electric coupling between the metal plate 700 and the metal film 800 is potentially insufficient at a site where, for example, deformation of the metal plate 700 occurs. In this case, with the conductive member 500, it is possible to ensure electric coupling from the first terminals 200 and the second terminals 300 to the metal plate 700 through the metal film 800 and the conductive member 500 even in a case in which there is a site where, for example, deformation of the metal plate 700 occurs.

The light adjustment device 100 includes the external coupling wire 400 joined to the metal plate 700. The light adjustment device manufacturing method includes the external coupling wire attachment process of attaching the external coupling wire 400 to the metal plate 700.

Thus, in a case in which the external coupling wire 400 is coupled to the metal plate 700 through, for example, solder, the strength of attachment of the external coupling wire 400 to the metal plate 700 is higher and work of coupling the external coupling wire 400 to the metal plate 700 is easier than in a case in which, for example, the external coupling wire 400 is coupled to the conductive member 500.

Second Embodiment

Figure 15:
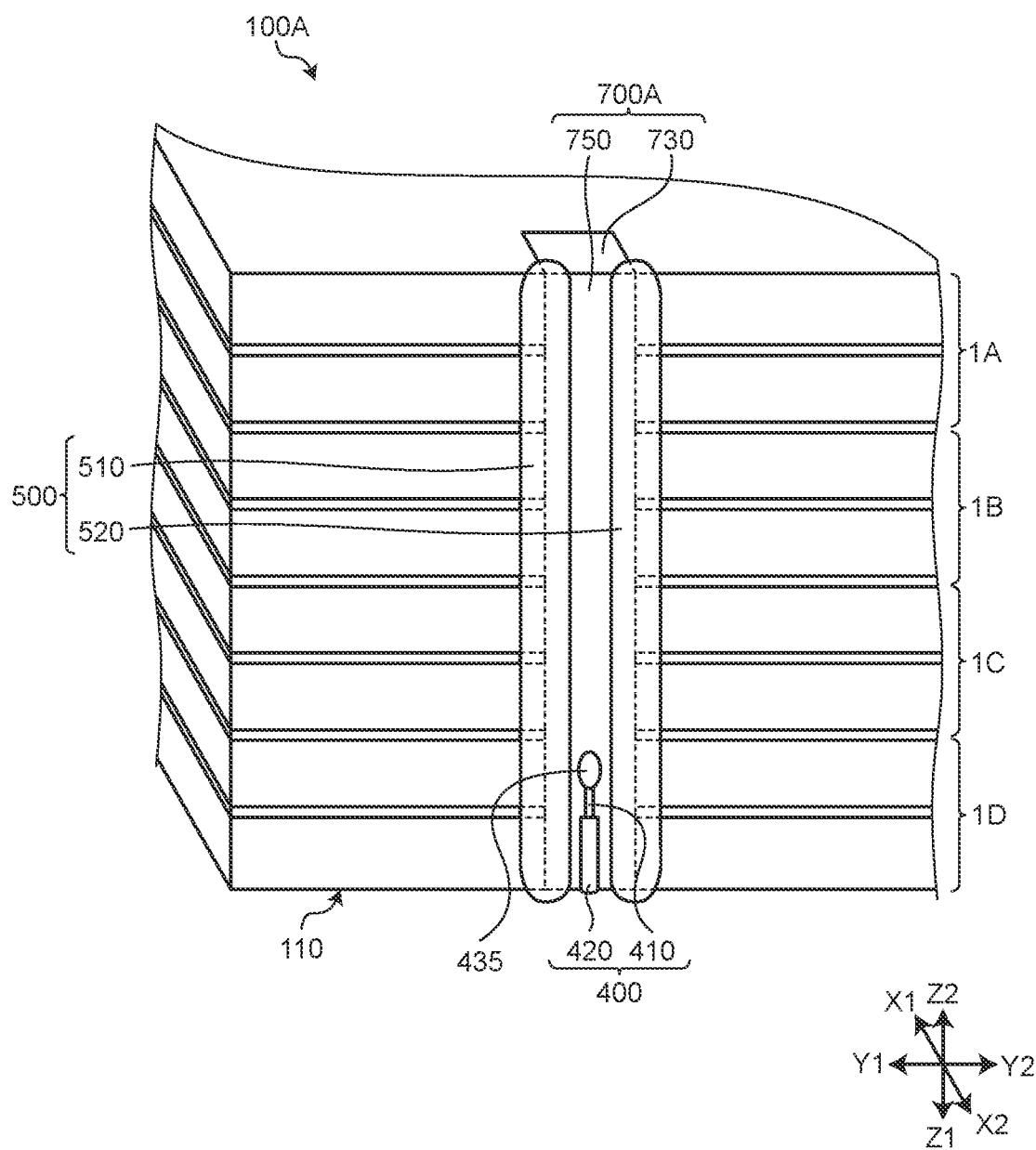
FIG. 15 is an enlarged perspective view of part of the light adjustment device in FIG. 14.

The following describes a light adjustment device according to a second embodiment. FIG. 14 is a perspective view schematically illustrating the light adjustment device according to the second embodiment. FIG. 15 is an enlarged perspective view of part of the light adjustment device in FIG. 14.

A light adjustment device 100A according to the second embodiment is different from the light adjustment device 100 according to the first embodiment in sites where the metal film 800, a metal plate 700A, the conductive member 500, and the external coupling wire 400 are disposed. The following description of the second embodiment is mainly made on the difference.

In the first embodiment, the metal film 800, the metal plate 700, the conductive member 500, and the external coupling wire 400 are disposed at each of the four corners of the panel unit 110. However, in the second embodiment, the metal film, the metal plate 700A, the conductive member 500, and the external coupling wire 400 are disposed at each of the four side surfaces of the panel unit 110 as illustrated in FIGS. 14 and 15. Specifically, these components are disposed at each of a Y-directional substantially central part of a side surface of the panel unit 110 on the X1 side, a Y-directional substantially central part of a side surface thereof the X2 side, an X-directional substantially central part of a side surface thereof on the Y1 side, and an X-directional substantially central part of a side surface thereof on the Y2 side.

The metal plate 700A includes a plane part 750 and the top surface part 730. Similarly to the metal plate 700 of the first embodiment, the metal plate 700A may be, for example, a copper tape. The metal plate 700A is joined on the metal film 800 as in the first embodiment. The plane part 750 is a rectangular metal plate extending in the Z direction. The plane part 750 extends in the Z direction from the light adjustment panel 1D to the light adjustment panel 1A. The top surface part 730 has a square shape. Two of the top surface parts 730 are provided and connected to end parts of the plane part 750 on the Z1 and Z2 sides, respectively.

The conductive member 500 includes the first conductive member 510 and the second conductive member 520. As in the first embodiment, the first conductive member 510 and the second conductive member 520 straddle and join a side part of the plane part 750 and the metal film. The first conductive member 510 and the second conductive member 520 continuously extend in the Z direction from an end part of the plane part 750 on the Z1 side to an end part thereof the Z2 side.

Figure 16:
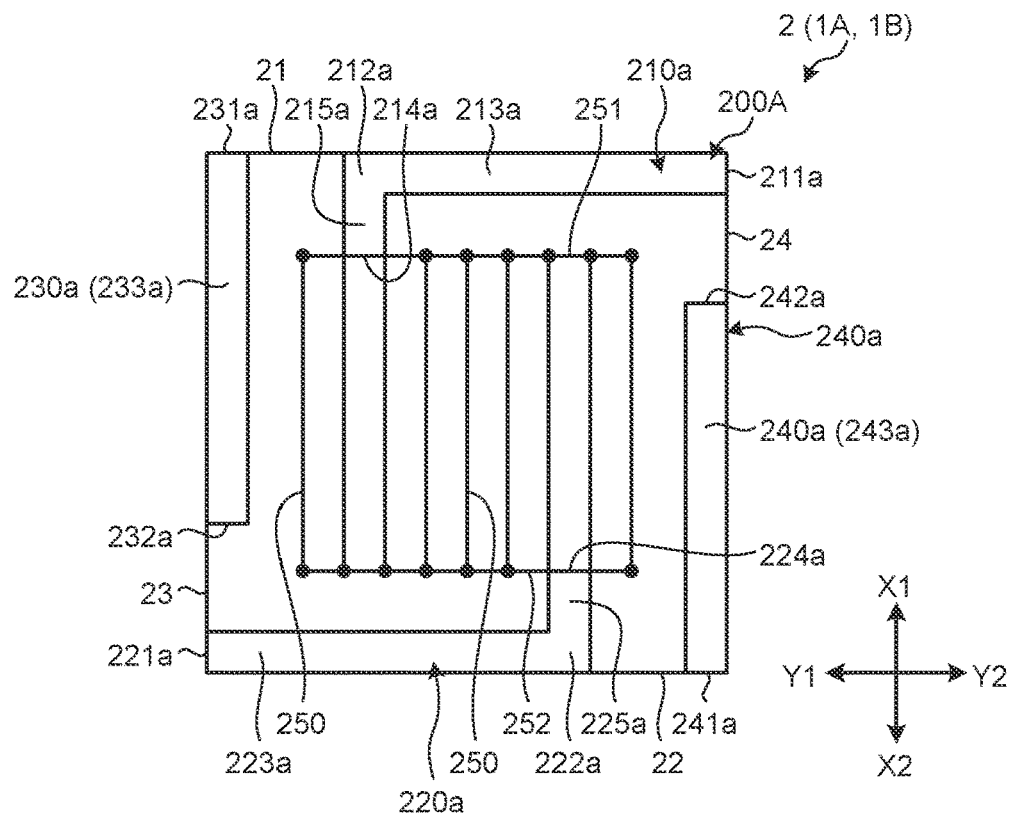
FIG. 16 is a plan view of a first substrate of each of the light adjustment panels disposed first and second from the Z2 side in a panel unit illustrated in FIG. 15.
Figure 17:
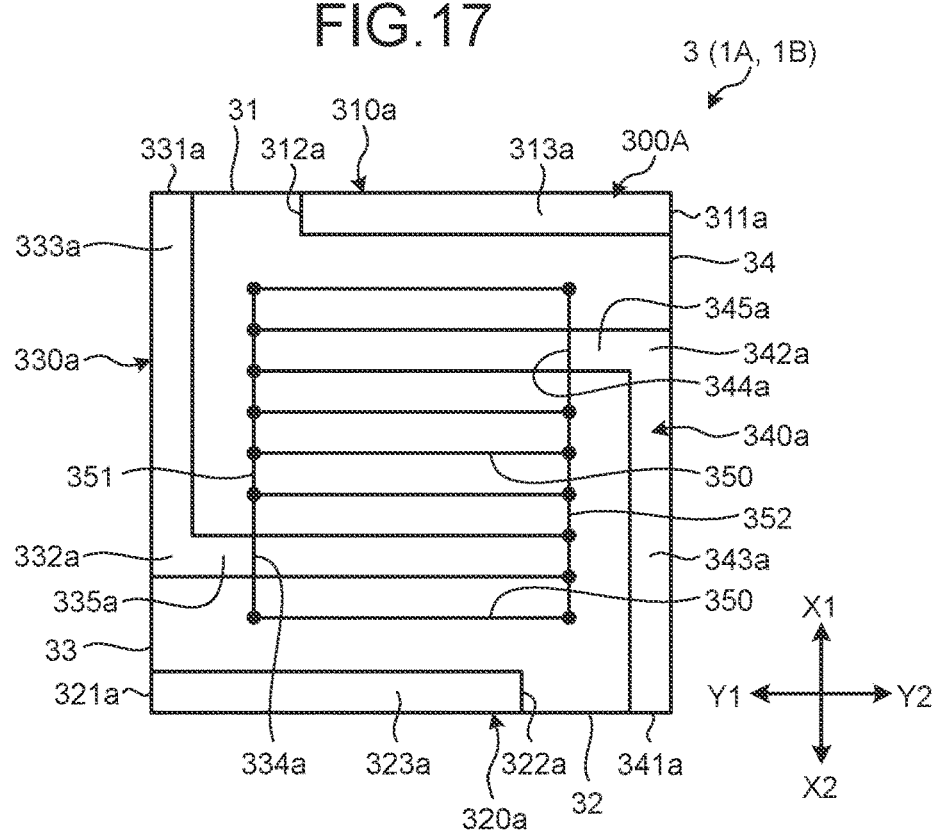
FIG. 17 is a plan view of a second substrate of each of the light adjustment panels disposed first and second from the Z2 side in the panel unit illustrated in FIG. 15.
Figure 18:
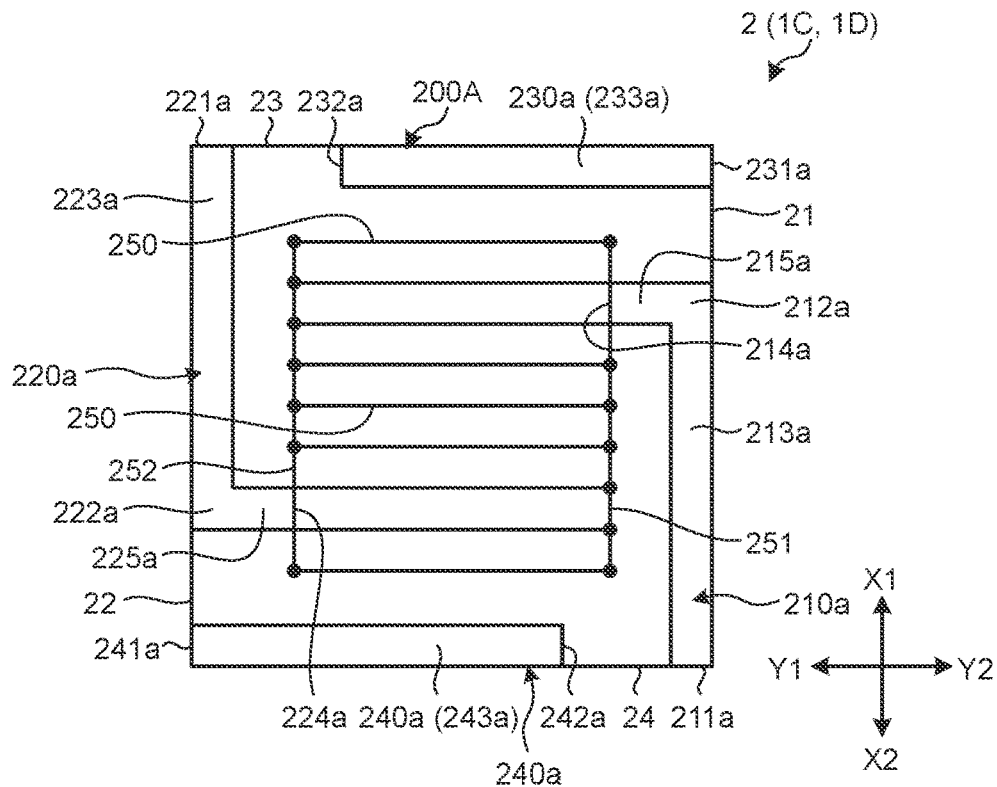
FIG. 18 is a plan view of a first substrate of each of light adjustment panels disposed third and fourth from the Z2 side in the panel unit illustrated in FIG. 15.
Figure 19:
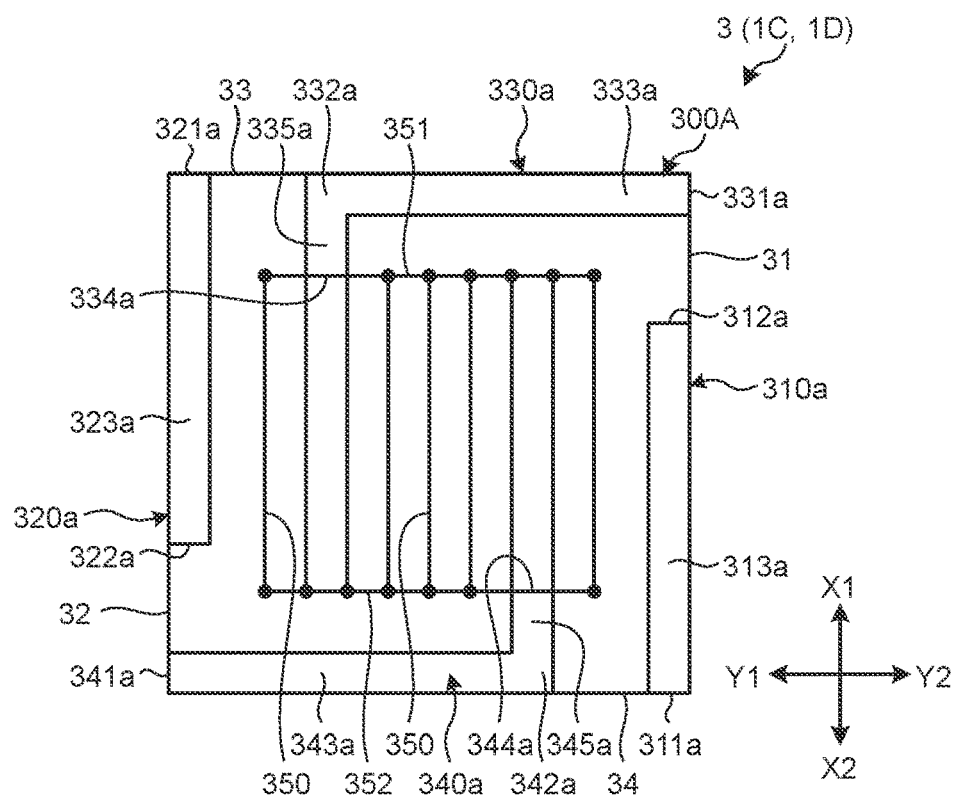
FIG. 19 is a plan view of a second substrate of each of the light adjustment panels disposed third and fourth from the Z2 side in the panel unit illustrated in FIG. 15.
Figure 20:
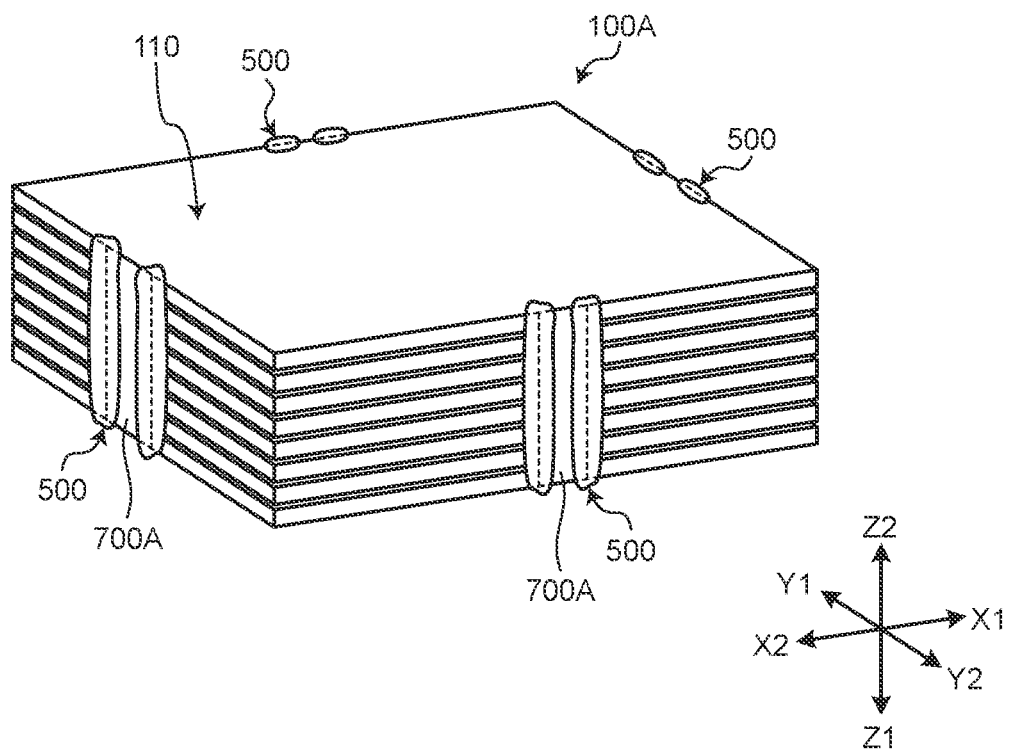
FIG. 20 is a schematic diagram of the light adjustment device according to the second embodiment.

The following describes wires and terminals of each first substrate 2 and each second substrate 3 included in the panel unit 110 in detail. FIG. 16 is a plan view of the first substrate of each of light adjustment panels disposed first and second from the Z2 side in the panel unit illustrated in FIG. 15. FIG. 17 is a plan view of the second substrate of each of the light adjustment panels disposed first and second from the Z2 side in the panel unit illustrated in FIG. 15. FIG. 18 is a plan view of the first substrate of each of light adjustment panels disposed third and fourth from the Z2 side in the panel unit illustrated in FIG. 15. FIG. 19 is a plan view of the second substrate of each of the light adjustment panels disposed third and fourth from the Z2 side in the panel unit illustrated in FIG. 15. FIG. 20 is a schematic diagram of the light adjustment device according to the second embodiment.

As illustrated in FIG. 16, the first substrate 2 of each of the light adjustment panel 1A and the light adjustment panel 1B includes a first terminal 200A and the liquid crystal drive electrode 250. The first terminal 200A includes first terminals 210a, 220a, 230a, and 240a. The first substrate 2 is a square in plan view and has a first side 21, a second side 22, a third side 23, and a fourth side 24. The first side 21 is positioned on the X1 side. The second side 22 is positioned on the X2 side. The third side 23 is positioned on the Y1 side. The fourth side 24 is positioned on the Y2 side.

The first terminal 210a includes straight parts 213a and 215a. The straight parts 213a and 215a are wide strip bodies. The straight part 213a extends from an end 211a to an end 212a. The straight part 213a extends along the first side 21. The straight part 215a extends from the end 212a to an end 214a. The end 214a is coupled to the wire 251. The liquid crystal drive electrode 250 is provided at the center of the first substrate 2, and the wire 251 is electrically coupled to the liquid crystal drive electrode 250. The wire 251 extends in the Y direction. A plurality of the liquid crystal drive electrodes 250 are provided and extend in the X direction.

The first terminal 220a includes straight parts 223a and 225a. The straight parts 223a and 225a are wide strip bodies. The straight part 223a extends from an end 221a to an end 222a. The straight part 223a extends along the second side 22. The straight part 225a extends from the end 222a to an end 224a. The end 224a is coupled to the wire 252. The wire 252 is coupled to the liquid crystal drive electrodes 250. The wire 252 extends in the Y direction.

The first terminal 230a includes a straight part 233a. The straight part 233a is a wide strip body. The straight part 233a extends from an end 231a to an end 232a. The straight part 233a extends along the third side 23.

The first terminal 240a includes a straight part 243a. The straight part 243a is a wide strip body. The straight part 243a extends from an end 241a to an end 242a. The straight part 243a extends along the fourth side 24.

As illustrated in FIG. 17, the second substrate 3 of each of the light adjustment panel 1A and the light adjustment panel 1B includes a second terminal 300A and a liquid crystal drive electrode 350. The second terminal 300A includes second terminals 310a, 320a, 330a, and 340a. The second substrate 3 is a square in plan view and has a first side 31, a second side 32, a third side 33, and a fourth side 34. The first side 31 is positioned on the X1 side. The second side 32 is positioned on the X2 side. The third side 33 is positioned on the Y1 side. The fourth side 34 is positioned on the Y2 side.

The second terminal 310a includes a straight part 313a. The straight part 313a is a wide strip body. The straight part 313a extends from an end 311a to an end 312a. The straight part 313a extends along the first side 31.

The second terminal 320a includes a straight part 323a. The straight part 323a is a wide strip body. The straight part 323a extends from an end 321a to an end 322a. The straight part 323a extends along the second side 32.

The second terminal 330a includes straight parts 333a and 335a. The straight parts 333a and 335a are wide strip bodies. The straight part 333a extends from an end 331a to an end 332a. The straight part 333a extends along the third side 33. The straight part 335a extends from the end 332a to an end 334a. The end 334a is coupled to the wire 351. The liquid crystal drive electrode 350 is provided at the center of the second substrate 3, and the wire 351 is electrically coupled to the liquid crystal drive electrode 350. The wire 351 extends in the X direction. A plurality of the liquid crystal drive electrodes 350 are provided and extend in the Y direction.

The second terminal 340a includes straight parts 343a and 345a. The straight parts 343a and 345a are wide strip bodies. The straight part 343a extends from an end 341a to an end 342a. The straight part 343a extends along the fourth side 34. The straight part 345a extends from the end 342a to an end 344a. The end 344a is coupled to the wire 352. The wire 352 is electrically coupled to the liquid crystal drive electrodes 350. The wire 352 extends in the X direction.

The light adjustment panels 1C and 1D to be described below are obtained by rotating the light adjustment panels 1A and 1B by 90° in the clockwise direction (rightward direction). Thus, the positions of wires, terminals, and electrodes of the first substrate 2 and the second substrate 3 included in each of the light adjustment panels 1C and 1D are obtained by rotating the positions of wires, terminals, and electrodes of the first substrate 2 and the second substrate 3 included in each of the light adjustment panels 1A and 1B by 90° in the clockwise direction (rightward direction).

As in the first embodiment, the light adjustment panels 1A, 1B, 1C, and 1D are vertically stacked to produce the panel unit 110. Then, the metal film, the metal plate 700A, the conductive member 500, and the external coupling wire 400 are provided at the substantially central part of each side surface of the panel unit 110 in the right-left direction, which completes the light adjustment device 100A according to the second embodiment.

As described above, the same effects as in the first embodiment are achieved in the second embodiment. In particular, in the second embodiment, the metal film, the metal plate 700A, the conductive member 500, and the external coupling wire 400 are provided at the substantially central part of each side surface of the panel unit 110 when viewed in the stacking direction as described above. Thus, for example, the length of the external coupling wire 400 can be set to be shorter in a case in which the light source 430 coupled to the external coupling wire 400 is disposed at a substantially central part of the panel unit 110 when viewed in the stacking direction.

In the first embodiment, the metal plate 700 includes the first side surface part 710, the second side surface part 720, and the top surface part 730. However, the metal plate 700A according to the second embodiment includes one rectangular plane part 750 and the top surface part 730. Thus, the metal plate 700A has a simpler configuration. Moreover, work of joining the metal plate 700A to each side surface of the panel unit 110 is easier. Furthermore, in a case in which the first conductive member 510 and the second conductive member 520 are applied at each corner of the panel unit 110 as in the first embodiment, work of applying the conductive member 500 is easier in the second embodiment.

Third Embodiment

Figure 21:
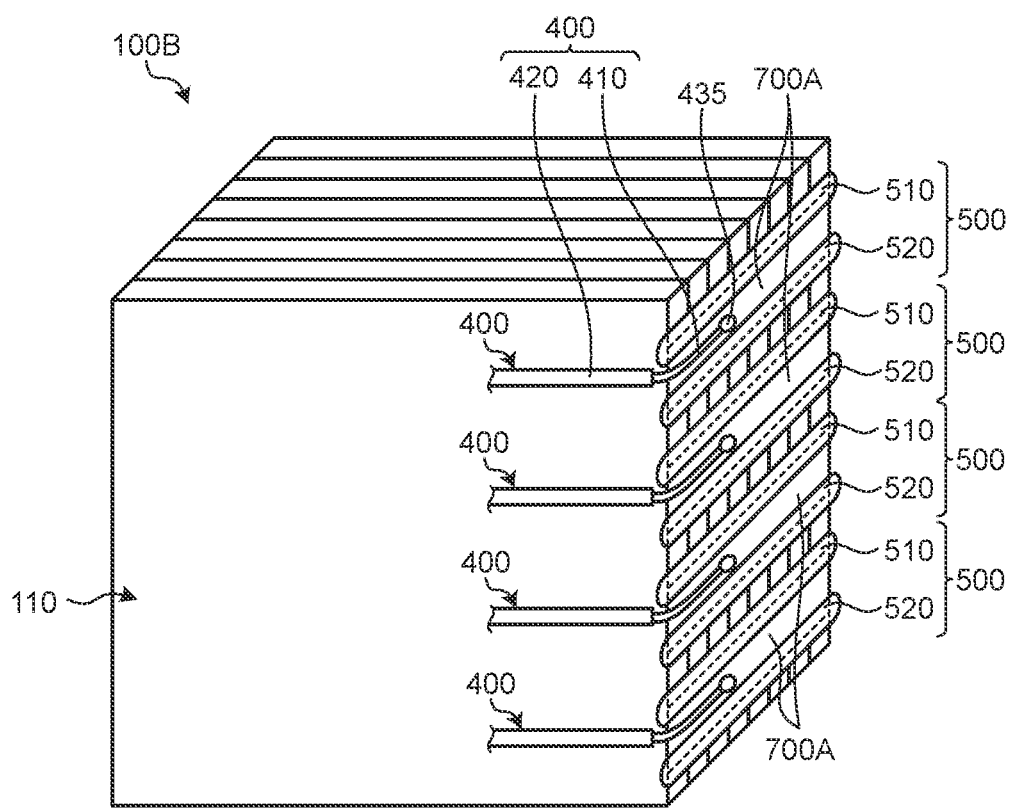
FIG. 21 is a perspective view schematically illustrating a light adjustment device according to a third embodiment.

The following describes a light adjustment device according to a third embodiment. FIG. 21 is a perspective view schematically illustrating the light adjustment device according to the third embodiment.

A light adjustment device 100B according to the third embodiment is different from the light adjustment device 100A according to the second embodiment in sites where the metal film 800, the metal plate 700A, the conductive member 500, and the external coupling wire 400 are disposed. The following description of the third embodiment is mainly made on the difference.

In the second embodiment, the metal film, the metal plate 700A, the conductive member 500, and the external coupling wire 400 are disposed on each of the four side surfaces of the panel unit 110. However, in the third embodiment, four metal films, four metal plates 700A, four conductive members 500, and four external coupling wires 400 are disposed on one side surface (for example, side surface on the Y2 side illustrated in FIG. 21) of the panel unit 110 as illustrated in FIG. 21. The four metal films, the four metal plates 700A, the four conductive members 500, and the four external coupling wires 400 are disposed, for example, at equal intervals in the X direction.

Figure 22:
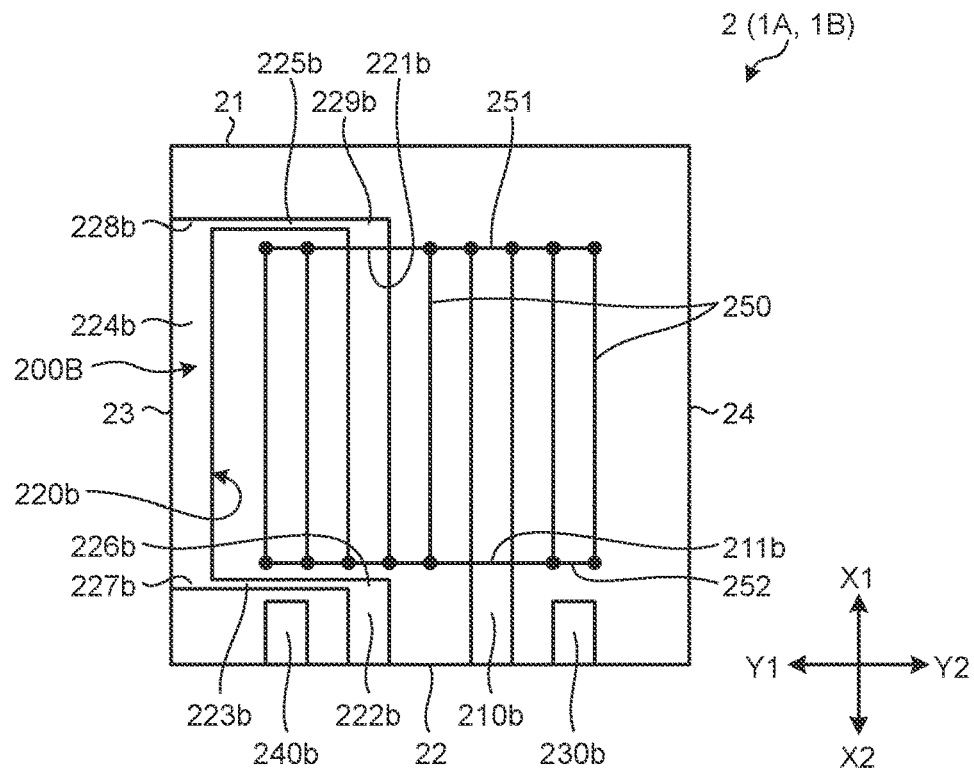
FIG. 22 is a plan view of a first substrate of each of light adjustment panels disposed first and second from the Z2 side in a panel unit illustrated in FIG. 21.
Figure 23:
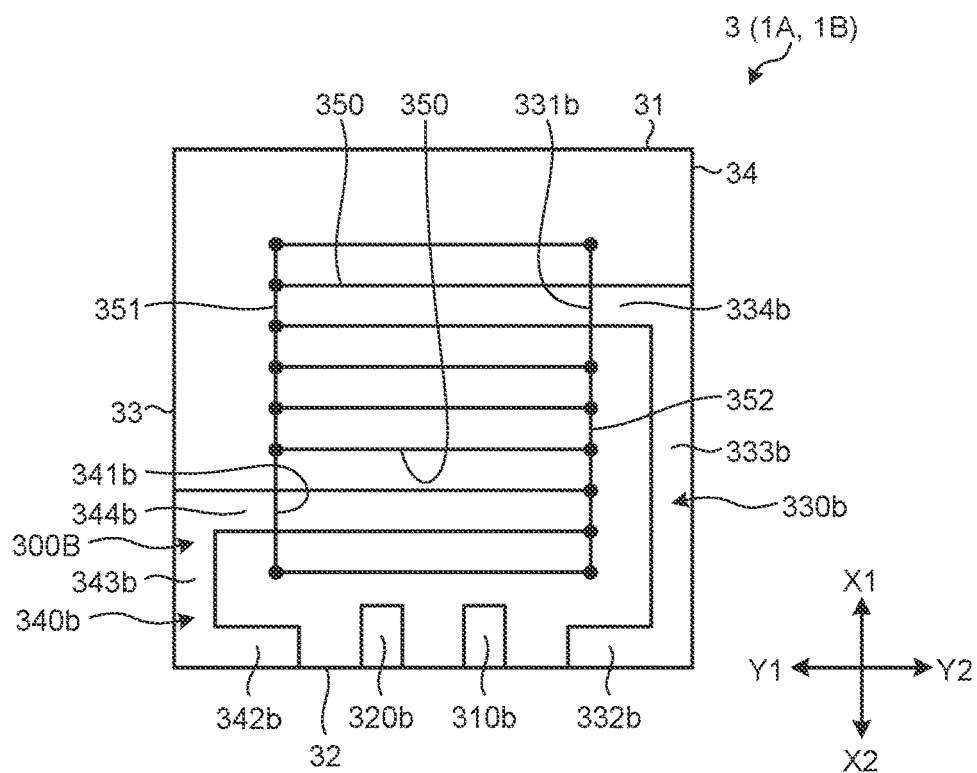
FIG. 23 is a plan view of a second substrate of each of the light adjustment panels disposed first and second from the Z2 side in the panel unit illustrated in FIG. 21.
Figure 24:
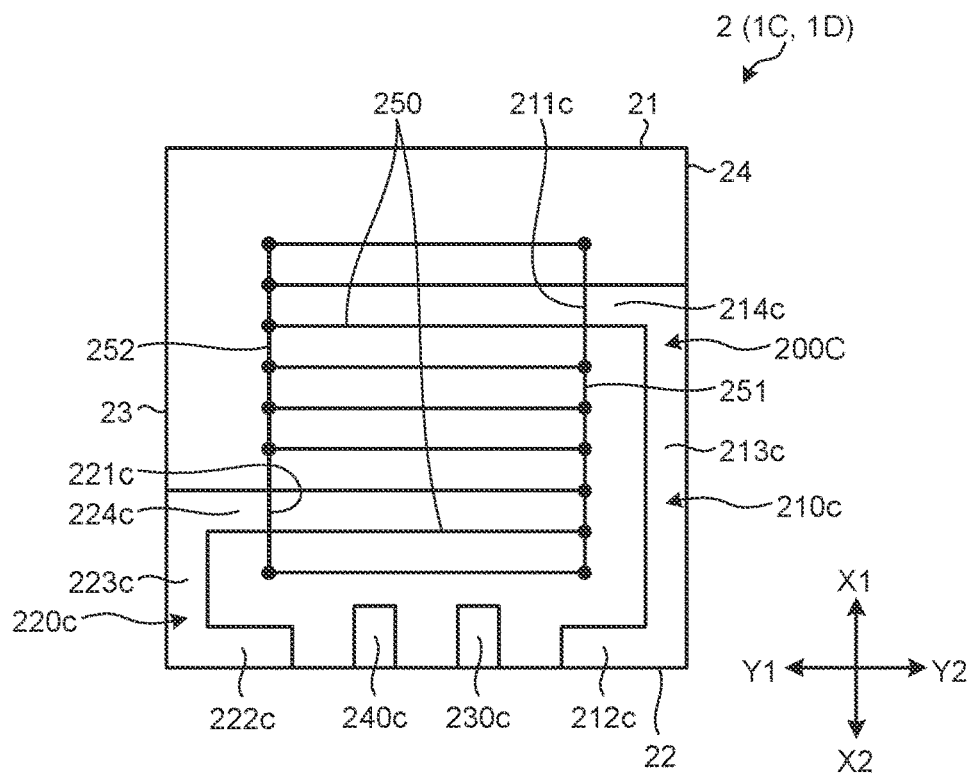
FIG. 24 is a plan view of a first substrate of each of light adjustment panels disposed third and fourth from the Z2 side in the panel unit illustrated in FIG. 21.
Figure 25:
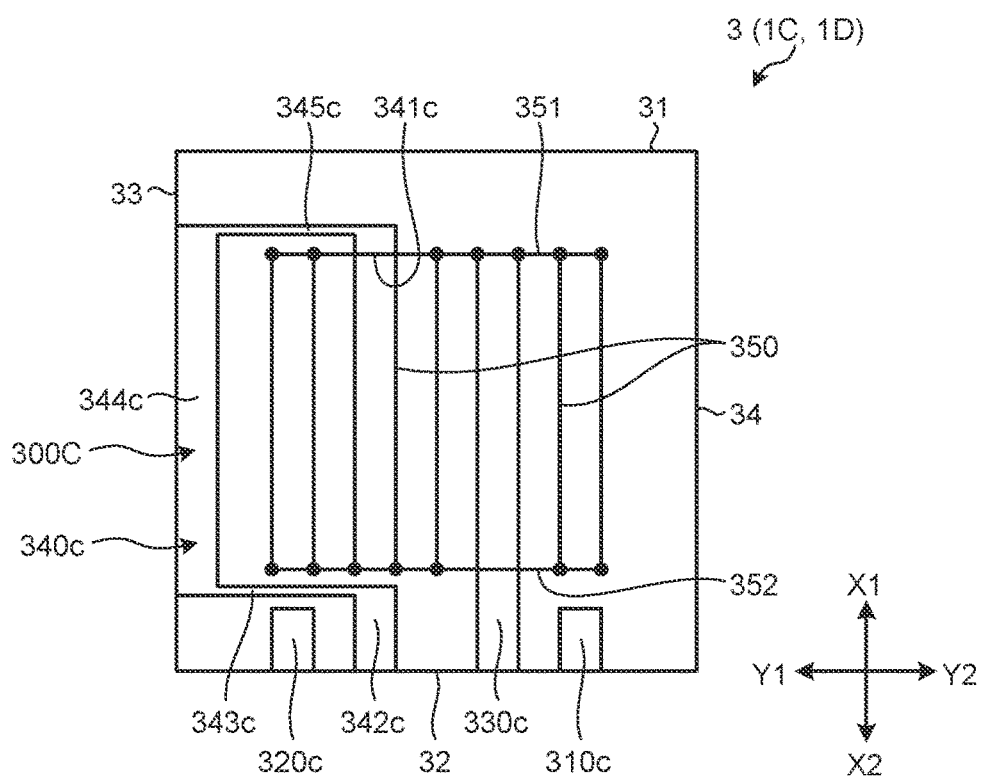
FIG. 25 is a plan view of a second substrate of each of the light adjustment panels disposed third and fourth from the Z2 side in the panel unit illustrated in FIG. 21.

The following describes wires and terminals of each first substrate 2 and each second substrate 3 included in the panel unit 110 in detail. FIG. 22 is a plan view of the first substrate of each of light adjustment panels disposed first and second from the Z2 side in the panel unit illustrated in FIG. 21. FIG. 23 is a plan view of the second substrate of each of the light adjustment panels disposed first and second from the Z2 side in the panel unit illustrated in FIG. 21. FIG. 24 is a plan view of the first substrate of each of light adjustment panels disposed third and fourth from the Z2 side in the panel unit illustrated in FIG. 21. FIG. 25 is a plan view of the second substrate of each of the light adjustment panels disposed third and fourth from the Z2 side in the panel unit illustrated in FIG. 21.

As illustrated in FIG. 22, the first substrate 2 of each of the light adjustment panel 1A and the light adjustment panel 1B includes a first terminal 200B and the liquid crystal drive electrode 250. The first terminal 200B includes first terminals 210$b$, 220$b$, 230$b$, and 240$b$. The first side 21 is positioned on the X1 side. The second side 22 is positioned on the X2 side. The third side 23 is positioned on the Y1 side. The fourth side 24 is positioned on the Y2 side.

The first terminal 210$b$ is provided at the second side 22. An end 211$b$ of the first terminal 210$b$ is coupled to the wire 252. The first terminal 220$b$ includes straight parts 222$b$, 223$b$, 224$b$, and 225$b$. The straight part 222$b$ extends from the second side 22 to an end 226$b$. The straight part 223$b$ extends from the end 226$b$ to an end 227$b$. The straight part 224$b$ extends from the end 227$b$ to an end 228$b$. The straight part 225$b$ extends from the end 228$b$ to an end 229$b$. The end 229$b$ is coupled to the wire 251.

The first terminal 230$b$ is provided at the second side 22. The first terminal 230$b$ is positioned on the Y2 side of the first terminal 210$b$.

The first terminal 240$b$ is provided at the second side 22. The first terminal 240$b$ is positioned on the Y1 side of the straight part 222$b$.

At the second side 22 of the first substrate 2, the first terminal 230$b$, the first terminal 210$b$, the straight part 222$b$ of the first terminal 220$b$, and the first terminal 240$b$ are arranged in order from the Y2 side toward the Y1 side.

As illustrated in FIG. 23, the second substrate 3 of each of the light adjustment panel 1A and the light adjustment panel 1B includes a second terminal 300B and the liquid crystal drive electrode 350. The second terminal 300B includes second terminals 310$b$, 320$b$, 330$b$, and 340$b$.

The second terminals 310$b$ and 320$b$ are provided at the second side 32. The second terminal 310$b$ is disposed on the Y2 side of the second terminal 320$b$.

The second terminal 330$b$ includes straight parts 332$b$, 333$b$, and 334$b$. The straight part 332$b$ extends along the second side 32. The straight part 333$b$ extends along the fourth side 34. The straight part 334$b$ has an end 331$b$, and the end 331$b$ is coupled to the wire 352.

The second terminal 340$b$ includes straight parts 342$b$, 343$b$, and 344$b$. The straight part 342$b$ extends along the second side 32. The straight part 343$b$ extends along the third side 33. The straight part 344$b$ has an end 341$b$, and the end 341$b$ is coupled to the wire 351.

The following describes the light adjustment panels 1C and 1D. The positions of terminals, wires, and liquid crystal drive electrodes of the first substrate of each of the light adjustment panels 1C and 1D coincide with the positions of terminals, wires, and liquid crystal drive electrodes of the second substrate of each of the light adjustment panels 1A and 1B when viewed from above. In other words, the positions of terminals, wires, and liquid crystal drive electrodes are the same between the first substrate illustrated in FIG. 24 and the second substrate illustrated in FIG. 23. Moreover, the positions of terminals, wires, and liquid crystal drive electrodes are the same between the second substrate illustrated in FIG. 25 and the first substrate illustrated in FIG. 22. Specific description is given below.

As illustrated in FIG. 24, the first substrate 2 of each of the light adjustment panel 1C and the light adjustment panel 1D includes a first terminal 200C and the liquid crystal drive electrode 250. The first terminal 200C includes first terminals 210$c$, 220$c$, 230$c$, and 240$c$. The first side 21 is positioned on the X1 side. The second side 22 is positioned on the X2 side. The third side 23 is positioned on the Y1 side. The fourth side 24 is positioned on the Y2 side.

The first terminal 210$c$ includes straight parts 212$c$, 213$c$, and 214$c$. The straight part 212$c$ extends along the second side 22. The straight part 213$c$ extends along the fourth side 24. The straight part 214$c$ has an end 211$c$, and the end 211$c$ is coupled to the wire 251.

The first terminal 220$c$ includes straight parts 222$c$, 223$c$, and 224$c$. The straight part 222$c$ extends along the second side 22. The straight part 223$c$ extends along the third side 23. The straight part 224$c$ has an end 221$c$, and the end 221$c$ is coupled to the wire 252.

The first terminals 230$c$ and 240$c$ are provided at the second side 22. The first terminal 230$c$ is positioned on the Y2 side of the first terminal 240$c$.

As illustrated in FIG. 25, the second substrate 3 of each of the light adjustment panel 1C and the light adjustment panel 1D includes a second terminal 300C and a liquid crystal drive electrode 350. The second terminal 300C includes second terminals 310$c$, 320$c$, 330$c$, and 340$c$.

The second terminals 310$c$ and 320$c$ are provided at the second side 32. The second terminal 310$c$ is positioned on the Y2 side of the second terminal 320$c$.

The second terminal 330$c$ is provided at the second side 32. The second terminal 330$c$ is coupled to the wire 352.

The second terminal 340$c$ includes straight parts 342$c$, 343$c$, 344$c$, and 345$c$. The straight part 342$c$ is provided at the second side 32. The straight part 343$c$ extends from a leading end of the straight part 342$c$ toward the Y1 side. The straight part 344$c$ extends along the third side 33. The straight part 345$c$ extends in the y direction, and an end 341$c$ is coupled to the wire 351.

As described above, in the third embodiment, the four metal films, the four metal plates 700A, the four conductive members 500, and the four external coupling wires 400 are disposed on one side surface (for example, side surface on the Y2 side illustrated in FIG. 21) of the panel unit 110 as illustrated in FIG. 21. Thus, work of forming the four metal films, the four metal plates 700A, and the four conductive members 500 is easier, and the external coupling wires 400 can be routed out from the one side surface of the panel unit 110.

The material of each metal film 800, the target 453, and particles 454 of the target in the first to third embodiments is not limited to platinum (Pt) but may be, for example, copper (Cu). In a case in which each metal plate 700 is a copper tape, the external coupling wire 400 can be directly coupled to the metal film 800 by employing copper (Cu) as the material of the metal film 800 and the like, and this configuration leads to reduction of manufacturing cost.

What is claimed is:
1. A light adjustment device comprising:
a panel unit including a plurality of light adjustment panels stacked in a first direction, each light adjustment panel including a first substrate and a second substrate, the first substrate including a first terminal, the second substrate overlapping the first substrate and including a second terminal;
a metal film provided at a side part of the panel unit and extending in the first direction, wherein the metal film includes a first site joined to a side surface of the first substrate of each of the plurality of light adjustment panels, a second site extending from the first site toward an inside of the panel unit and electrically coupled to the first terminal, a third site joined to a side surface of the second substrate of each of the plurality of light adjustment panels, and a fourth site extending from the third site toward the inside of the panel unit and electrically coupled to the second terminal; and a metal plate contacting the first site and the third site of the metal film and continuously extending in the first direction.

2. The light adjustment device according to claim 1, further comprising a conductive member straddling and joining a side part of the metal plate and the metal film and continuously extending in the first direction.

3. The light adjustment device according to claim 1, further comprising an external coupling wire joined to the metal plate.

4. A light adjustment device manufacturing method comprising:

a panel unit production process of producing a panel unit stacking a plurality of light adjustment panels in a first direction, each light adjustment panel including first substrate and a second substrate, the first substrate including a first terminal, the second substrate overlapping the first substrate and including a second terminal;

a metal film formation process of forming a metal film by sputtering after the panel unit production process, the metal film being provided at a side part of the panel unit and extending in the first direction, wherein the metal film includes a first site joined to a side surface of the first substrate of each of the plurality of light adjustment panels, a second site extending from the first site toward an inside of the panel unit and electrically coupled to the first terminal, a third site joined to a side surface of the second substrate of each of the plurality of light adjustment panels, and a fourth site extending from the third site toward the inside of the panel unit and electrically coupled to the second terminal; and a metal plate attachment process of attaching a metal plate to a side part of the panel unit after the metal film formation process, the metal plate contacting the first and third sites of the metal film and continuously extending in the first direction.

5. The light adjustment device manufacturing method according to claim 4, further comprising a conductive member formation process of forming a conductive member at the side part of the panel unit after the metal plate attachment process, the conductive member straddling and joining a side part of the metal plate and the metal film and continuously extending in the first direction.

6. The light adjustment device manufacturing method according to claim 4, further comprising an external coupling wire attachment process of attaching an external coupling wire to the metal plate after the metal plate attachment process.

* * * * *